US012646001B2

(12) United States Patent
Zhang et al.

(10) Patent No.: US 12,646,001 B2
(45) Date of Patent: *Jun. 2, 2026

(54) COLLECTING OBSERVATIONS FOR MACHINE LEARNING

(71) Applicant: Microsoft Technology Licensing, LLC, Redmond, WA (US)

(72) Inventors: Cheng Zhang, Cambridge (GB); Wenbo Gong, Cambridge (GB); Richard Eric Turner, Cambridge (GB); Sebastian Tschiatschek, Cambridge (GB); Josè Miguel Hernández Lobato, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/450,365

(22) Filed: Aug. 15, 2023

(65) Prior Publication Data

US 2023/0394368 A1 Dec. 7, 2023

Related U.S. Application Data

(63) Continuation of application No. 16/507,025, filed on Jul. 9, 2019, now Pat. No. 11,769,074.

(30) Foreign Application Priority Data

Jun. 13, 2019 (GB) ..................................... 1908532

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
None
See application file for complete search history.

(56) References Cited

PUBLICATIONS

Ma, Chao, et al. "Eddi: Efficient dynamic discovery of high-value information with partial vae." arXiv preprint arXiv:1809.11142 (2018). (Year: 2018).*
Wu, Jian, et al. "Active learning with label correlation exploration for multi-label image classification." IET Computer Vision 11.7 (2017): 577-584. (Year: 2017).*

(Continued)

*Primary Examiner* — Omar F Fernandez Rivas
*Assistant Examiner* — Chaitanya R Jayakumar
(74) *Attorney, Agent, or Firm* — Barta Jones, PLLC

(57) ABSTRACT

A model that includes a generative network mapping a latent vector to a feature vector, wherein weights in the generative network are modelled as probabilistic distributions, is trained on observed data points with incomplete observations of the feature vector to learn values of the weights. From a plurality of potential next features to observe, a target feature is selected that maximizes a measure of expected reduction in uncertainty in the distribution of the weights given the observed data points so far. A target data point comprising at least the target feature is then requested, and the generative network is further trained based on the target data point received in response to the request.

20 Claims, 11 Drawing Sheets

(56) References Cited

PUBLICATIONS

Nie, Siqi, Meng Zheng, and Qiang Ji. "The deep regression bayesian network and its applications: Probabilistic deep learning for computer vision." IEEE Signal Processing Magazine 35.1 (2018): 101-111. (Year: 2018).*

Shi, Jiaxin, et al. "ZhuSuan: A library for Bayesian deep learning." arXiv preprint arXiv:1709.05870 (2017). (Year: 2017).*

Tran, Toan, et al. "Bayesian generative active deep learning." International conference on machine learning. PMLR, 2019. (Year: 2019).*

Hoffman, Matthew D. "Learning deep latent Gaussian models with Markov chain Monte Carlo." International conference on machine learning. PMLR, 2017. (Year: 2017).*

Communication pursuant to Article 94(3) Received in European Patent Application No. 20725387.3, mailed on Jun. 2, 2025, 06 pages.

* cited by examiner

Input vector X

Classification Y

Figure 3

COLLECTING OBSERVATIONS FOR MACHINE LEARNING

CROSS-REFERENCE TO RELATED APPLICATION

This application is a continuation application of and claims priority to U.S. patent application Ser. No. 16/507,025, entitled "COLLECTING OBSERVATIONS FOR MACHINE LEARNING," filed on Jul. 9, 2019, which claims priority to GB Patent Application No. 1908532.3, entitled "COLLECTING OBSERVATIONS FOR MACHINE LEARNING," filed on Jun. 13, 2019, the disclosure of which are incorporated herein by reference in their entireties.

BACKGROUND

Neural networks are used in the field of machine learning and artificial intelligence (AI). A neural network comprises plurality of nodes which are interconnected by links, sometimes referred to as edges. The input edges of one or more nodes form the input of the network as a whole, and the output edges of one or more other nodes form the output of the network as a whole, whilst the output edges of various nodes within the network form the input edges to other nodes. Each node represents a function of its input edge(s) weighted by a respective weight, the result being output on its output edge(s). The weights can be gradually tuned based on a set of experience data (e.g. training data) so as to tend towards a state where the output of the network will output a desired value for a given input.

Typically the nodes are arranged into layers with at least an input and an output layer. A "deep" neural network comprises one or more intermediate or "hidden" layers in between the input layer and the output layer. The neural network can take input data and propagate the input data through the layers of the network to generate output data. Certain nodes within the network perform operations on the data, and the result of those operations is passed to other nodes, and so on.

FIG. 1(a) gives a simplified representation of an example neural network 108. The example neural network comprises multiple layers of nodes 104: an input layer 102i, one or more hidden layers 102h and an output layer 102o. In practice, there may be many nodes in each layer, but for simplicity only a few are illustrated. Each node is configured to generate an output by carrying out a function on the values input to that node. The inputs to one or more nodes form the input of the neural network, the outputs of some nodes form the inputs to other nodes, and the outputs of one or more nodes form the output of the network.

At some or all of the nodes of the network, the input to that node is weighted by a respective weight. A weight may define the connectivity between a node in a given layer and the nodes in the next layer of the neural network. A weight can take the form of a scalar or a probabilistic distribution. When the weights are defined by a distribution, as in a Bayesian model, the neural network can be fully probabilistic and captures the concept of uncertainty. The values of the connections 106 between nodes may also be modelled as distributions. This is illustrated schematically in FIG. 1(b). The distributions may be represented in the form of a set of samples or a set of parameters parameterizing the distribution (e.g. the mean $\mu$ and standard deviation $\sigma$ or variance $\sigma^2$).

The network learns by operating on data input at the input layer, and adjusting the weights applied by some or all of the nodes based on the input data. There are different learning approaches, but in general there is a forward propagation through the network from left to right in FIG. 1(a), a calculation of an overall error, and a backward propagation of the error through the network from right to left in FIG. 1(a). In the next cycle, each node takes into account the back propagated error and produces a revised set of weights. In this way, the network can be trained to perform its desired operation.

The input to the network is typically a vector, each element of the vector representing a different corresponding feature. E.g. in the case of image recognition the elements of this feature vector may represent different pixel values, or in a medical application the different features may represent different symptoms. The output of the network may be a scalar or a vector. The output may represent a classification, e.g. an indication of whether a certain object such as an elephant is recognized in the image, or a diagnosis of the patient in the medical example.

FIG. 1(c) shows a simple arrangement in which a neural network is arranged to predict a classification based on an input feature vector. During a training phase, experience data comprising a large number of input data points is supplied to the neural network, each data point comprising an example set of values for the feature vector, labelled with a respective corresponding value of the classification (e.g. elephant or not elephant). Over many such example data points, the learning algorithm tunes the weights to reduce the overall error in the network. Once trained with a suitable number of data points, an unlabelled feature vector can then be input to the neural network, and the network can instead predict the value of the classification based on the input feature values and the tuned weights.

Training in this manner is sometimes referred to as a supervised approach. Other approaches are also possible, such as a reinforcement approach wherein the network each data point is not initially labelled. The learning algorithm begins by guessing the corresponding output for each point, and is then told whether it was correct, gradually tuning the weights with each such piece of feedback. Another example is an unsupervised approach where input data points are not labelled at all and the learning algorithm is instead left to infer its own structure in the experience data.

SUMMARY

An issue with a machine-learning model as illustrated in FIG. 1(c) is that there may be little training data available to begin with. Consider the case where the model takes a feature vector as an input, the feature vector comprising a plurality of elements. Not only may there be only a small number of data points available in the initial training data, but some or all of the data points may each be an incomplete observation: i.e. the observation contains values for only some but not all of the features in the feature vector.

Furthermore, to collect each individual new feature to add to the observations may come at a cost. For instance in a medical setting, sampling any one feature may require a certain medical test to be performed on the subject (e.g. patient), which may take up valuable time and/or resources, and/or which may be intrusive to the subject.

To address such issues or similar, the present disclosure provides a method for determining which feature it would be most effective to observe next in order to reduce the expected error in the prediction or imputation. For instance this may be used to improve the efficiency of an initial training period, and/or to allow the model to be deployed with relatively little training data and then obtain further observations "in-the-field", during ongoing use.

According to one aspect disclosed herein, there is provided a method of training a model that comprises one or more neural networks including at least a generative network, the generative network having a latent vector as an input vector and a feature vector as an output vector. Each element of the feature vector represents a different one of a set of features. The weights applied by at least some nodes in the generative network are each modelled as a probabilistic distribution. The method comprises: a) obtaining one or more observed data points, each comprising a respective subset of feature values, wherein within each subset, each feature value is a value of a corresponding one of a subset of the features in the feature vector (i.e. each of these observed data points is an incomplete observation of the feature vector); and b) training the model based on the observed data points to learn values of the weights of the generative network which map the latent vector to the feature vector. The method further comprises c) from amongst a plurality of potential next features to observe, searching for a target feature of the feature vector which maximizes a measure of expected reduction in uncertainty in a distribution of said weights of the generative network given the observed data points so far. The method then comprises d) outputting a request to collect a target data point comprising at least the target feature.

In embodiments the method can even start with no data. In this case it may begin, prior to obtaining any observed data points, by outputting a request for one or more randomly selected data points to be observed as the one or more observed data points. Alternatively the method may begin with an initial group of one or more observed data points that were collected "offline".

BRIEF DESCRIPTION OF THE DRAWINGS

To assist understanding of embodiments of the present disclosure and to illustrate how such embodiments may be put into effect, reference is made, my way of example only, to the accompanying drawings in which.

DETAILED DESCRIPTION OF EMBODIMENTS

The following will present a solution to a problem referred to herein the "ice-start" problem, i.e. the challenge of training machine learning models when only little or no training data is initially available, and when acquiring a value of each feature element is associated with a cost. This setting is representative for real-world machine learning applications. For instance, in the health-care domain, when training an AI system for predicting patient metrics from lab tests, obtaining every single measurement comes with high cost. Mere active learning, where only the label is associated with a cost, does not address such a problem, because performing all possible lab tests to acquire a new training datum would be costly, as well as unnecessary due to redundancy. The present disclosure presents an idea that may be referred to as "Icebreaker", a principled framework to approach the ice-start problem. In embodiments Icebreaker uses a full Bayesian Deep Latent Gaussian Model (BELGAM) with a novel inference method. In embodiments the method combines recent advances in amortized inference and stochastic gradient MCMC to enable fast and accurate posterior inference. Utilizing BELGAM's ability to fully quantify model uncertainty, the method may also use two information acquisition functions for imputation and active prediction problems. The disclosure will demonstrate the excellent performance of Icebreaker in tasks relevant for recommender systems and health-care applications.

First however there is described an example system in which the presently disclosed techniques may be implemented. There is also provided an overview of the principles behind neural networks and variational auto encoders, based upon which embodiments may be built or expanded.

Figure 2:
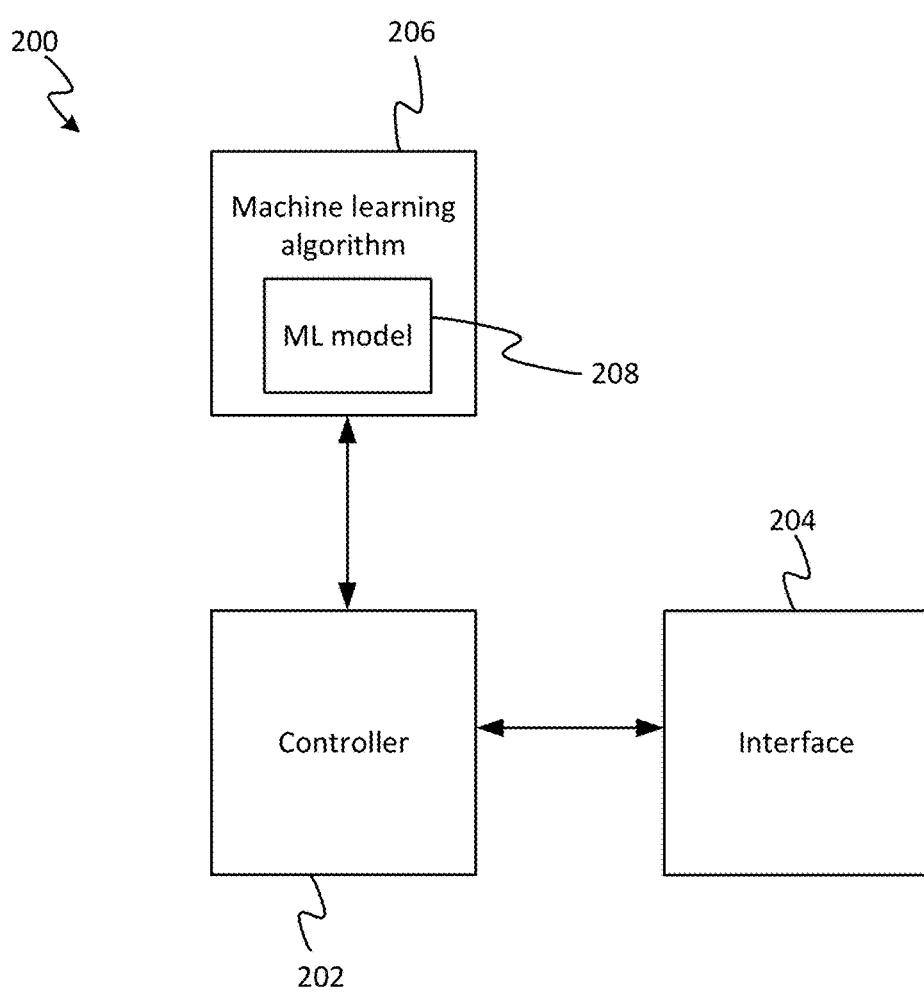
FIG. 2 is a schematic illustration of a computing apparatus for implementing a neural network, FIG. 3 schematically illustrates a data set comprising a plurality of data points each comprising one or more feature values.

FIG. 2 illustrates an example computing apparatus 200 for implementing an artificial intelligence (AI) algorithm including a machine-learning model in accordance with embodiments described herein. The computing apparatus 200 may take the form of a user terminal such as a desktop computer, laptop computer, tablet, smartphone, wearable smart device such as a smart watch, or an on-board computer of a vehicle such as car, etc. Additionally or alternatively, the computing apparatus 200 may comprise a server. A server herein refers to a logical entity which may comprise one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network.

The computing apparatus 200 comprises at least a controller 202, an interface (e.g. a user interface) 204, and an artificial intelligence (AI) algorithm 206. The controller 202 is operatively coupled to each of the interface 204 and the AI algorithm 206.

Each of the controller 202, interface 204 and AI algorithm 206 may be implemented in the form of software code embodied on computer readable storage and run on processing apparatus comprising one or more processors such as CPUs, work accelerator co-processors such as GPUs, and/or other application specific processors, implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, one, some or all the controller 202, interface 204 and AI algorithm 206 may be implemented on the server. Alternatively, a respective instance of one, some or all of these components may be implemented in part or even wholly on each of one, some or all of the one or more user terminals. In further examples, the functionality of the above-mentioned components may be split between any combination of the user terminals and the server. Again it is noted that, where required, distributed computing techniques are in themselves known in the art. It is also not excluded that one or more of these components may be implemented in dedicated hardware.

The controller 202 comprises a control function for coordinating the functionality of the interface 204 and the AI algorithm 206. The interface 204 refers to the functionality for receiving and/or outputting data. The interface 204 may comprise a user interface (UI) for receiving and/or outputting data to and/or from one or more users, respectively; or it may comprise an interface to a UI on another, external device. Alternatively the interface may be arranged to collect data from and/or output data to an automated function implemented on the same apparatus or an external device. In the case of an external device, the interface 204 may comprise a wired or wireless interface for communicating, via a wired or wireless connection respectively, with the external device. The interface 204 may comprise one or more constituent types of interface, such as voice interface, and/or a graphical user interface. The interface 204 may present a UI front end to the user(s) through one or more I/O modules on their respective user device(s), e.g. speaker and microphone, touch screen, etc., depending on the type of user interface. The logic of the interface may be implemented on a server and output to the user through the I/O module(s) on his/her user device(s). Alternatively some or all of the logic of the interface 204 may also be implemented on the user device(s) 102 its/themselves.

The controller 202 is configured to control the AI algorithm 206 to perform operations in accordance with the embodiments described herein. It will be understood that any of the operations disclosed herein may be performed by the AI algorithm 206, under control of the controller 202 to collect experience data from the user and/or an automated process via the interface 204, pass it to the AI algorithm 206, receive predictions back from the AI algorithm and output the predictions to the user and/or automated process through the interface 204.

The AI algorithm 206 comprises a machine-learning model 208, comprising one or more constituent statistical models such as one or more neural networks.

Figure 1A:
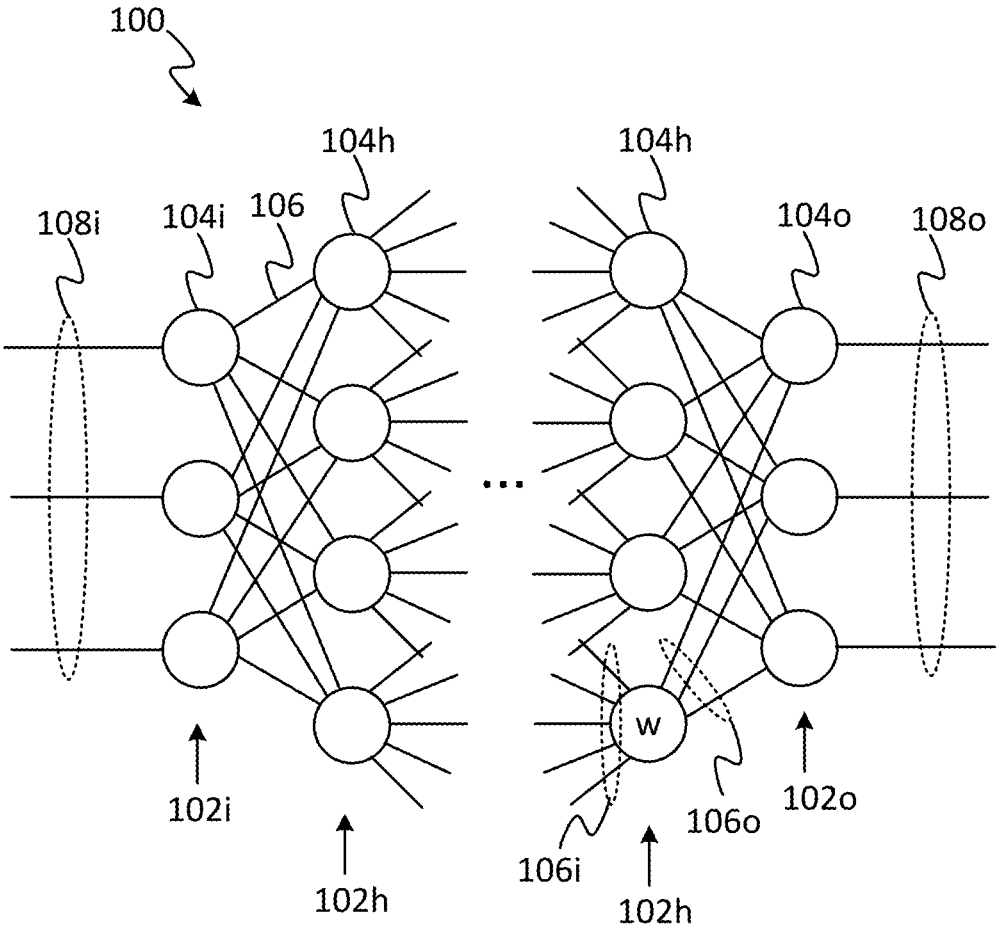
FIG. 1(a) is a schematic illustration of a neural network.

FIG. 1(a) illustrates the principle behind a neural network. A neural network 100 comprises a graph of interconnected nodes 104 and edges 106 connecting between nodes, all implemented in software. Each node 104 has one or more input edges and one or more output edges, with at least some of the nodes 104 having multiple input edges per node, and at least some of the nodes 104 having multiple output edges per node. The input edges of one or more of the nodes 104 form the overall input 108i to the graph (typically an input vector, i.e. there are multiple input edges). The output edges of one or more of the nodes 104 form the overall output 108o of the graph (which may be an output vector in the case where there are multiple output edges). Further, the output edges of at least some of the nodes 104 form the input edges of at least some others of the nodes 104.

Each node 104 represents a function of the input value(s) received on its input edges(s) 106i, the outputs of the function being output on the output edge(s) 106o of the respective node 104, such that the value(s) output on the output edge(s) 106o of the node 104 depend on the respective input value(s) according to the respective function. The function of each node 104 is also parametrized by one or more respective parameters w, sometimes also referred to as weights (not necessarily weights in the sense of multiplicative weights, though that is certainly one possibility). Thus the relation between the values of the input(s) 106i and the output(s) 106o of each node 104 depends on the respective function of the node and its respective weight(s).

Figure 1B:
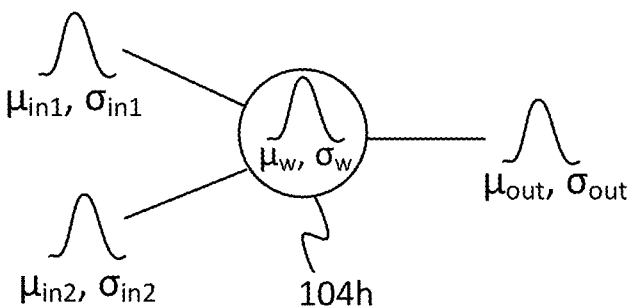
FIG. 1(b) is a schematic illustration of a neural network arranged to predict a classification based on an input feature vector.

Each weight could simply be a scalar value. Alternatively, as shown in FIG. 1(b), at some or all of the nodes 104 in the network 100, the respective weight may be modelled as a probabilistic distribution such as a Gaussian. In such cases the neural network 100 is sometimes referred to as a Bayesian neural network. Optionally, the value input/output on each of some or all of the edges 106 may each also be modelled as a respective probabilistic distribution. For any given weight or edge, the distribution may be modelled in terms of a set of samples of the distribution, or a set of parameters parameterizing the respective distribution, e.g. a pair of parameters specifying its centre point and width (e.g. in terms of its mean $\mu$ and standard deviation $\sigma$ or variance $\sigma^2$).

As shown in FIG. 1(a), the nodes 104 of the neural network 100 may be arranged into a plurality of layers, each layer comprising one or more nodes 104. In a so-called "deep" neural network, the neural network 100 comprises an input layer 102i comprising one or more input nodes 104i, one or more hidden layers 102h (also referred to as inner layers) each comprising one or more hidden nodes 104h (or inner nodes), and an output layer 102o comprising one or more output nodes 104o. For simplicity, only two hidden layers 102h are shown in FIG. 1(a), but many more may be present.

The different weights of the various nodes 104 in the neural network 100 can be gradually tuned based on a set of experience data (e.g. training data), so as to tend towards a state where the output 108o of the network will produce a desired value for a given input 108i. For instance, before being used in an actual application, the neural network 100 may first be trained for that application. Training comprises inputting experience data in the form of training data to the inputs 108i of the graph and then tuning the weights w of the nodes 104 based on feedback from the output(s) 108o of the graph. The training data comprises multiple different input data points, each comprising a value or vector of values corresponding to the input edge or edges 108i of the graph 100.

Figure 1C:
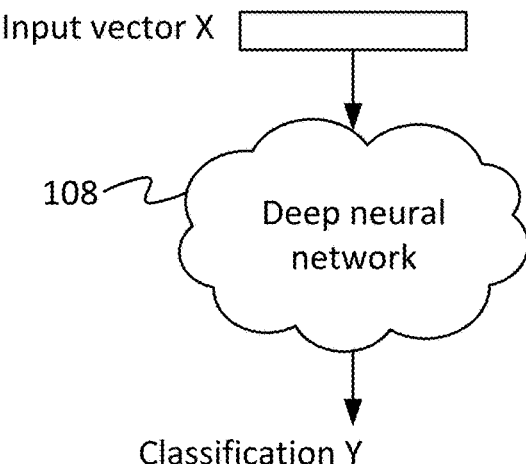
FIG. 1(c) is a schematic illustration of a node of a Bayesian neural network.

For instance, consider a simple example as in FIG. 1(c) where the machine-learning model comprises a single neural network 100, arranged to take a feature vector X as its input 108*i* and to output a classification Y as its output 108*o*. The input feature vector X comprises a plurality of elements $x_d$, each representing a different feature d=0, 1, 2, . . . etc. E.g. in the example of image recognition, each element of the feature vector X may represent a respective pixel value. For instance one element represents the red channel for pixel (0,0); another element represents the green channel for pixel (0,0); another element represents the blue channel of pixel (0,0); another element represents the red channel of pixel (0,1); and so forth. As another example, where the neural network is used to make a medical diagnosis, each of the elements of the feature vector may represent a value of a different symptom of the subject, physical feature of the subject, or other fact about the subject (e.g. body temperature, blood pressure, etc.).

Figure 3:
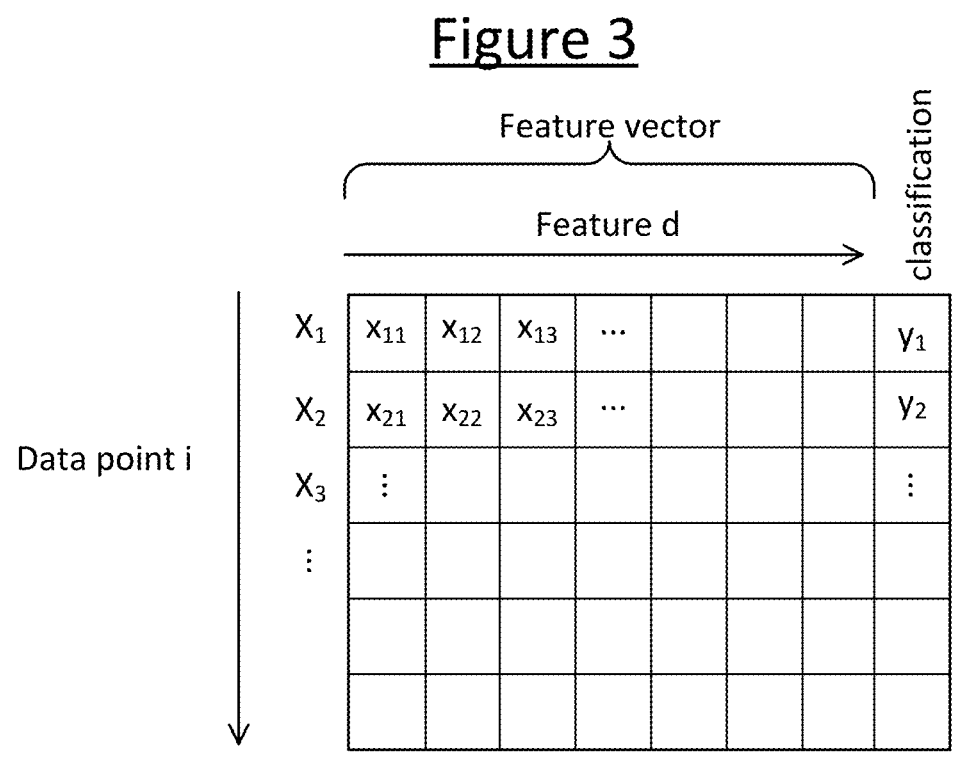

FIG. 3 shows an example data set comprising a plurality of data points i=0, 1, 2, . . . etc. Each data point i comprises a respective set of values of the feature vector (where $x_{id}$ is the value of the $d_{th}$ feature in the $i_{th}$ data point). The input feature vector $X_i$ represents the input observations for a given data point, where in general any given observation i may or may not comprise a complete set of values for all the elements of the feature vector X. The classification $Y_i$ represents a corresponding classification of the observation i. In the training data an observed value of classification $Y_i$ is specified with each data point along with the observed values of the feature vector elements (the input data points in the training data are said to be "labelled" with the classification $Y_i$). In subsequent a prediction phase, the classification Y is predicted by the neural network 100 for a further input observation X.

The classification Y could be a scalar or a vector. For instance in the simple example of the elephant-recognizer, Y could be a single binary value representing either elephant or not elephant, or a soft value representing a probability or confidence that the image comprises an image of an elephant. Or similarly, if the neural network 100 is being used to test for a particular medical condition, Y could be a single binary value representing whether the subject has the condition or not, or a soft value representing a probability or confidence that the subject has the condition in question. As another example, Y could comprise a "1-hot" vector, where each element represents a different animal or condition. E.g. Y=[1, 0, 0, . . . ] represents an elephant, Y=[0, 1, 0, . . . ] represents an hippopotamus, Y=[0, 0, 1, . . . ] represents a rhinoceros, et. Or if soft values are used, Y=[0.81, 0.12, 0.05, . . . ] represents an 81% confidence that the image comprises an image of an elephant, 12% confidence that it comprises an image of an hippopotamus, 5% confidence of a rhinoceros, etc.

In the training phase, the true value of $Y_i$ for each data point i is known. With each training data point i, the AI algorithm 206 measures the resulting output value(s) at the output edge or edges 108*o* of the graph, and uses this feedback to gradually tune the different weights w of the various nodes 108 so that, over many observed data points, the weights tend towards values which make the output(s) 108*i* (Y) of the graph 100 as close as possible to the actual observed value(s) in the experience data across the training inputs (for some measure of overall error). I.e. with each piece of input training data, the predetermined training output is compared with the actual observed output of the graph 302*o*. This comparison provides the feedback which, over many pieces of training data, is used to gradually tune the weights of the various nodes 104 in the graph toward a state whereby the actual output 108*o* of the graph will closely match the desired or expected output for a given input 108*i*. Examples of such feedback techniques include for instance stochastic back-propagation.

Once trained, the neural network 100 can then be used to infer a value of the output 108*o* (Y) for a given value of the input vector 108*i* (X), or vice versa.

Explicit training based on labelled training data is sometimes referred to as a supervised approach. Other approaches to machine learning are also possible. For instance another example is the reinforcement approach. In this case, the neural network 100 begins making predictions of the classification $Y_i$ for each data point i, at first with little or no accuracy. After making the prediction for each data point i (or at least some of them), the AI algorithm 206 receives feedback (e.g. from a human) as to whether the prediction was correct, and uses this to tune the weights so as to perform better next time. Another example is referred to as the unsupervised approach. In this case the AI algorithm receives no labelling or feedback and instead is left to infer its own structure in the experienced input data.

FIG. 1(*c*) is a simple example of the use of a neural network 100. In some cases, the machine-learning model 208 may comprise a structure of two or more constituent neural networks 100.

Figure 4:
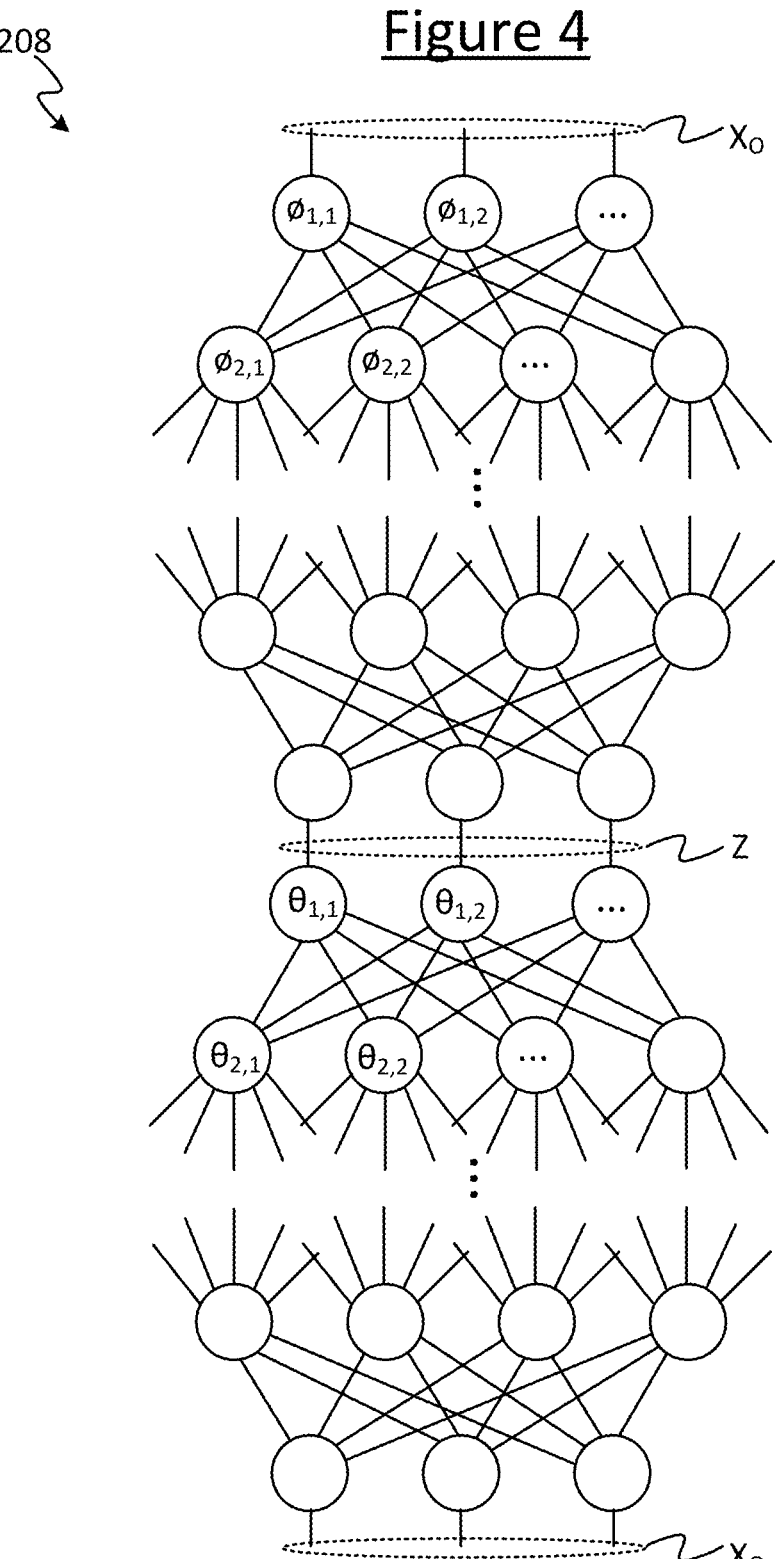
FIG. 4 is a schematic illustration of a variational auto encoder (VAE)

FIG. 4 schematically illustrates one such example, known as a variational auto encoder (VAE). In this case the machine learning model 208 comprises an encoder 208*q* comprising at least one inference network, and a decoder 208*p* comprising one or more generative networks. Each of the inference networks and the generative networks is an instance of a neural network 100, such as discussed in relation to FIG. 1(*a*). An inference network for the present purposes means a neural network arranged to encode an input into a latent representation of that input, and a generative network means a network arranged to at least partially decode from a latent representation.

The one or more inference networks are arranged to receive the observed feature vector X as an input and encode it into a latent vector Z (a representation in a latent space). The one or more generative networks 208*p* are arranged to receive the latent vector Z and decode back to the original feature space X.

The latent vector Z is a compressed (i.e. encoded) representation of the information contained in the input observations X. No one element of the latent vector Z necessarily represents directly any real world quantity, but the vector Z as a whole represents the information in the input data in compressed form. It could be considered conceptually to represent abstract features abstracted from the input data X, such as "wrinklyness of skin" and "trunk-like-ness" in the example of elephant recognition (though no one element of the latent vector can necessarily be mapped onto any one such factor, and rather the latent vector Z as a whole encodes such abstract information). The decoder 404 is arranged to decode the latent vector Z back into values in a real-world feature space, i.e. back to an uncompressed form representing the actual observed properties (e.g. pixel values).

The weights w of the one or more inference networks 208*q* are labelled herein ø, whilst the weights w of the one or more generative networks 208*p* are labelled θ. Each node 104 applies its own respective weight as illustrated in FIG. 3. Elsewhere herein the label ø generally may be used to refer to a vector of weights in one or more of the inference networks 208*q*, and θ to refer to a vector of weights in one or more of the generative networks 208*p*.

With each data point in the training data (or more generally each data point in the experience data during learning), the weights ø and θ are tuned so that the VAE 208 learns to encode the feature vector X into the latent space Z and back again. For instance, this may be done by minimizing a measure of divergence between $q_o(Z_i|X_i)$ and $p_\theta(X_i|Z_i)$, where $q_o(X_i|Z_i)$ is a function parameterised by ø representing a vector of the probabilistic distributions of the elements of $Z_i$ output by the encoder 208q given the input values of $X_i$, whilst $p_\theta(X_i|Z_i)$ is a function parameterized by θ representing a vector of the probabilistic distributions of the elements of Xi output by the encoder 208q given $Z_i$. The symbol "|" means "given". The model is trained to reconstruct $X_i$ and therefore maintains a distribution over $X_i$. At the "input side", the value of $X_i$ is known, and at the "output side", the likelihood of $X_i$ under the output distribution of the model is evaluated. Typically p(z|x) is referred to as posterior, and q(z|x) as approximate posterior. p(z) and q(z) are referred to as priors.

For instance, this may be done by minimizing the Kullback-Leibler (KL) divergence between $q_o(Z_i|X_i)$ and $p_\theta(X_i|Z_i)$. The minimization may be performed using an optimization function such as an ELBO (evidence lower bound) function, which uses cost function minimization based on gradient descent. However, in general other metrics and functions are also known in the art for tuning the encoder and decoder neural networks of a VAE.

The requirement to learn to encode to Z and back again amounts to a constraint placed on the overall neural network 208 of the VAE formed from the constituent neural networks 208q, 208p. This is the general principle of an autoencoder. The purpose of forcing the autoencoder to learn to encode and then decode a compressed form of the data, is that this can achieve one or more advantages in the learning compared to a generic neural network; such as learning to ignore noise in the input data, making better generalizations, or because when far away from a solution the compressed form gives better gradient information about how to quickly converge to a solution. In a variational autoencoder, the latent vector Z is subject to an additional constraint that it follows a predetermined form (type) of probabilistic distribution such as a multidimensional Gaussian distribution or gamma distribution.

Nonetheless, an issue with existing machine learning models is that they still do not perform well when training based on only a small number of partial observations (a partial observation being an incomplete vector of values for the feature vector X). This can be particularly problematic where each individual feature value comes at a cost in terms of time, money and/or resources each time it needs to be sampled, e.g. in a medical context where the model is being used to predict a condition of a subject. Refer again to the discussion in the Summary section.

To address this, the present disclosure provides a machine learning model that, over one or more steps, can determine which feature would be most effective to sample next in terms of improving the accuracy of the prediction or imputation.

Figures 4A, 9, 9A:
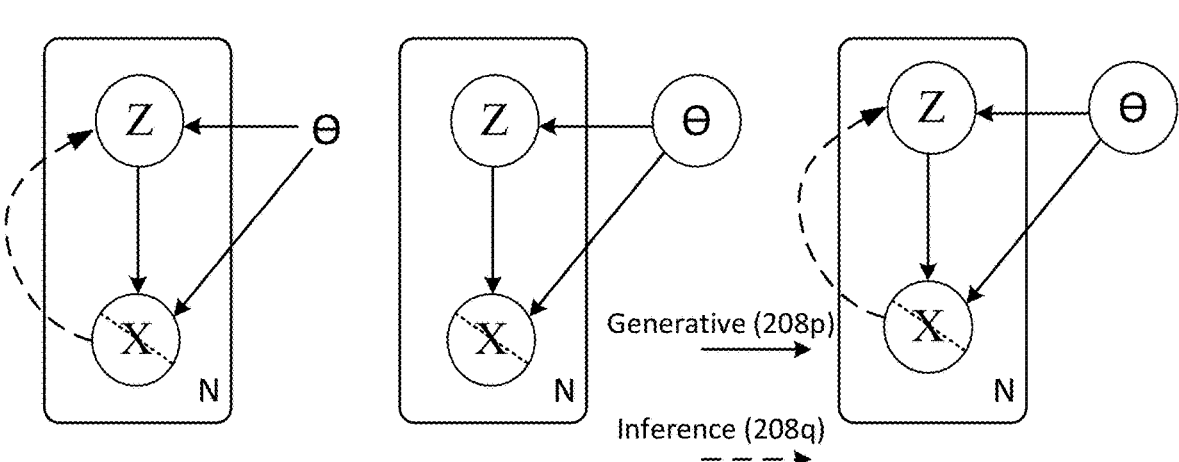
FIG. 4A is a high-level schematic representation of a VAE, FIG. 5 schematically illustrates a method of learning based on incomplete observations and of selecting a next data point to request.
FIG. 9 is a schematic illustration of a machine learning model in accordance with embodiments disclosed herein.
FIG. 9A is a schematic illustration of a further machine learning model in accordance with embodiments disclosed herein.

FIG. 4A shows an active learning model 208 as previously disclosed in UK patent application no. 1815743.8. This is a high level representation of a form variational auto encoder (VAE), similar to that shown in FIG. 4. The solid lines represent a generative network of the decoder 208q, and the dotted line represents an inference network of the encoder 208p.

In this form of diagram, a vector shown in a circle represents a vector of distributions. So here, each element of the feature vector X is modelled as a distribution, e.g. as discussed in relation to FIG. 1(*c*). Similarly each element of the latent vector Z is modelled as a distribution. On the other hand, a vector shown without a circle represents a fixed point. So here, the weights Θ of the generative network are modelled as simple values, not distributions. The rounded rectangle represents the "plate", meaning the vectors within the plate are iterated over a number N of learning steps (one for each data point). In other words i=0, . . . , N−1. A vector outside the plate is global, i.e. it does not scale with the number of data points i (nor the number of features d in the feature vector). The dotted line through X represents partial observations. I.e. for each observed data point (each observed instance of the feature vector X), the observed feature vector comprises an incomplete set of feature values (only a subset of the total number of possible features in the feature vector).

A model of the form shown in FIG. 4A can deal with partial observations to some extent. It is best suited to the case where the only cost per observation i is the cost in obtaining the label $Y_i$, and consequently a relatively large number of data points i can be obtained in order to train the model.

However, for cases where each individual feature $x_{id}$ is expensive to obtain (whether that be in terms of time, money and/or resources), then a further improved technique may be desirable. Particularly, it would be desirable if the model 208 could guide the operator (or automated process) as to which feature to sample next to add to the observations so as to improve the performance of the model for next time.

In embodiments, this can be used to enable the model to be deployed in-the-field, in actual use in a real-life application, with relatively little initial training data, and then gradually gather further data to improve performance during use. Alternatively or additionally, the disclosed method could be used to guide training during an initial training phase before deployment, in order to make training more efficient.

FIG. 9 shows a machine-learning model 208 in accordance with one embodiment disclosed herein. The model 208 comprises at least a generative network 208p having a latent vector Z as an input and the feature vector X as an output. Each of the feature vector X, latent vector Z and the vector of weights θ is modelled as a vector of distributions, e.g. as discussed in relation to FIG. 1(*c*). So as well as the elements of X and Z, at least some of the weights applied by each node 104 in the generative network 208p are each modelled as a probabilistic distribution, e.g. a Gaussian.

FIG. 9A shows a machine-learning model 208 in accordance with preferred embodiments. Here, the model 208 also comprises an inference network 208q taking the feature vector X as an input and having the latent vector Z as an output. The generative and inference networks 208p, 208q are thus arranged as a variational auto encoder. Each of the weights ø of the inference network 208q may be modelled as similar scalar values or as distributions.

Further, the AI algorithm 206 is configured to use the generative network 208p to determine which feature $x_{id}$ to obtain next in order to improve the performance of the model 208.

The model 208 is initially trained based on one or more observed data points $X_i$ in a training data set, tuning the weights to a certain extent so that the model 208 is able to make initial predictions or imputations with at least some degree of accuracy. If the model is deployed without any initial training, the AI algorithm 206 may begin by requesting a random data point to be observed as a starting point.

Figure 7:
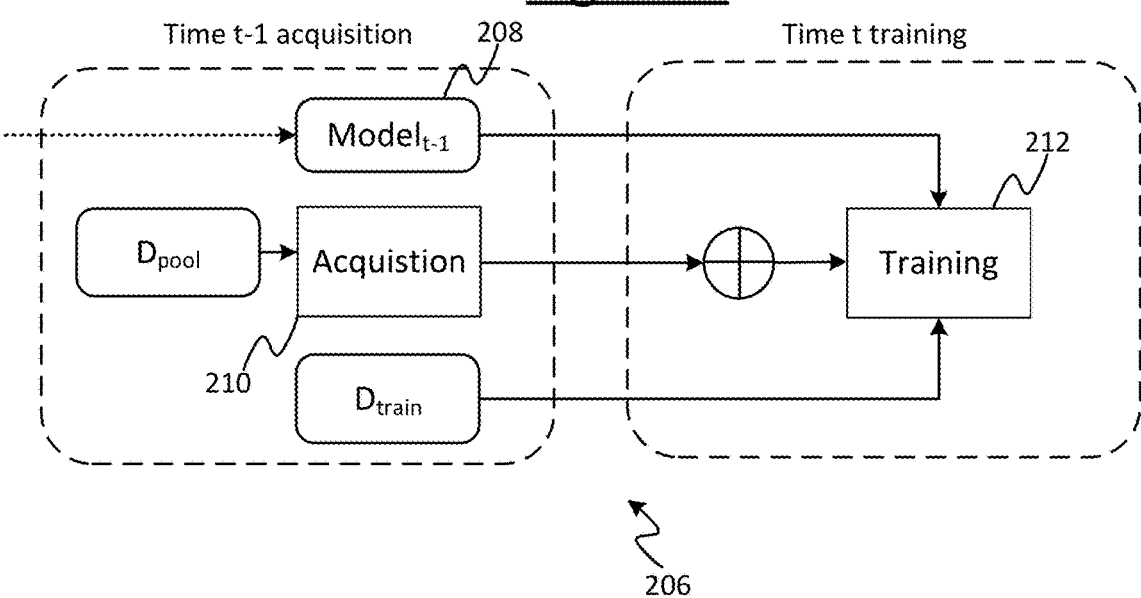
FIG. 7 is a flow diagram of an active training phase.
Figure 5:
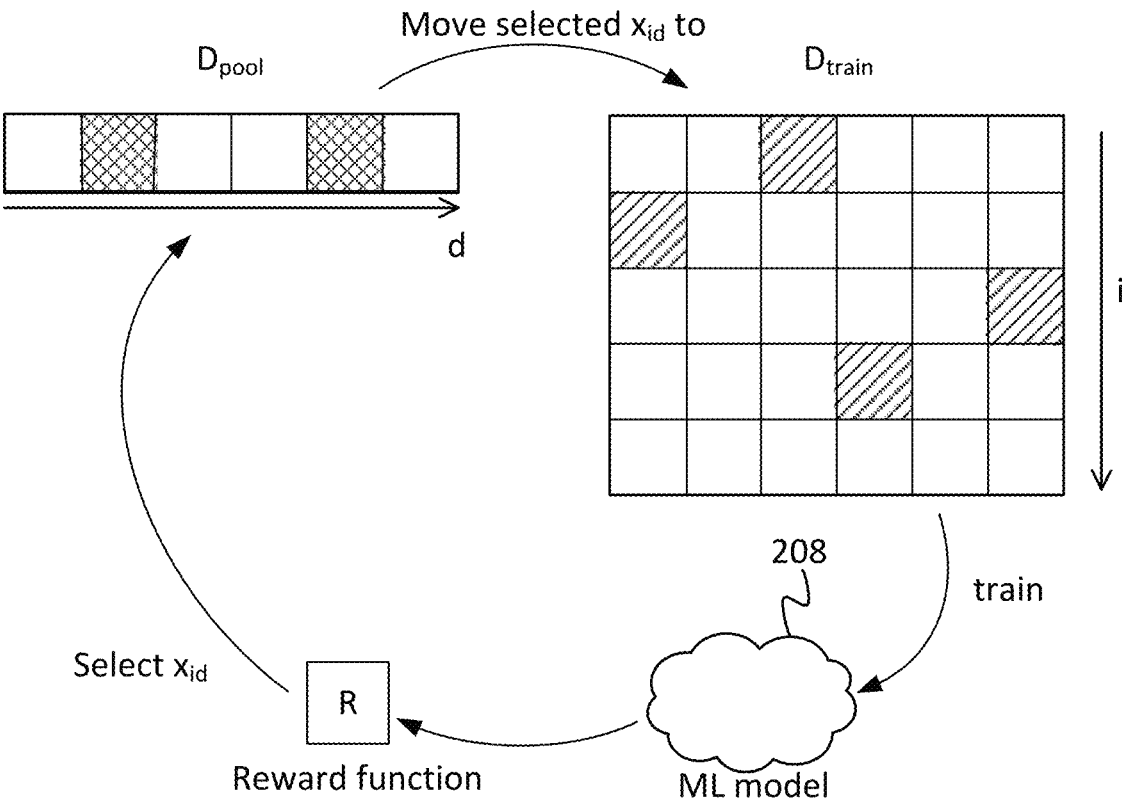

The AI algorithm then goes through an iterative method, as illustrated in FIGS. 5 and 7. The AI algorithm 206 comprises an acquisition module 210 and a training module 212 (each implemented in software). The training module 212 performs the initial training of the model 208 in a conventional manner based on a set of observed data points in a training data set $D_{train}$. Each observed data point comprises a respective vector of feature values $X_i$, comprising value for each of one or more of the features in the feature vector. Some data points could contain as few as one feature value each. The set of observed feature vectors as a whole over all data points i observed so far may be referred to herein as $X_o$. Optionally, each of some or all of the data points may also be labelled with a corresponding categorization $Y_i$.

The acquisition module 210 then searches, amongst a set of unobserved features $D_{pool}$, for a value of potential feature $x_{id}$ from that optimizes a reward function. $D_{pool}$ contains the feature elements not yet observed in $D_{train}$. The reward function comprise at least a measure of uncertainty in a posterior distribution $p(\theta|X_o, x_{id})$ the weights $\theta$ of the generative network 208$p$ given the observed data points $X_o$ observed so far. The acquisition function thus searches for the value of $x_{id}$ that minimizes the expected value of this measure of uncertainty. The posterior distribution is a function modelling a probabilistic distribution in the weights given a set of observations so far. Its form may be predetermined by the system designer. Suitable distribution functions, in themselves, will be known in the art. Similarly, suitable optimization functions for searching for a minimum will be known in the art.

Once the acquisition function has thus determined the next feature $x_{id}$ to request, it outputs a signal or message via the interface 204 requesting that a value of this feature is collected and returned to the algorithm 206 (being returned via the interface 204). The request may be output to a human user, who manually collects the required value and inputs it back through the interface 204 (in this case a user interface). Alternatively the request could be output to an automated process that automatically collects the requested feature and returns it via the interface. The newly collected feature $x_{id}$ may be collected as a stand-alone feature value (i.e. the collected $x_{id}$ is the only evaluated feature in the newly collected data point). Alternatively it could be collected along with one or more other feature values (i.e. the newly collected data point comprises a values of a plurality of features of the feature vector including the requested feature). Either way, the value of the newly collected feature(s) is/are then included amongst the observed data points $X_0$ in the observed data set $D_{train}$, and removed from the pool $D_{pool}$.

Figure 6:
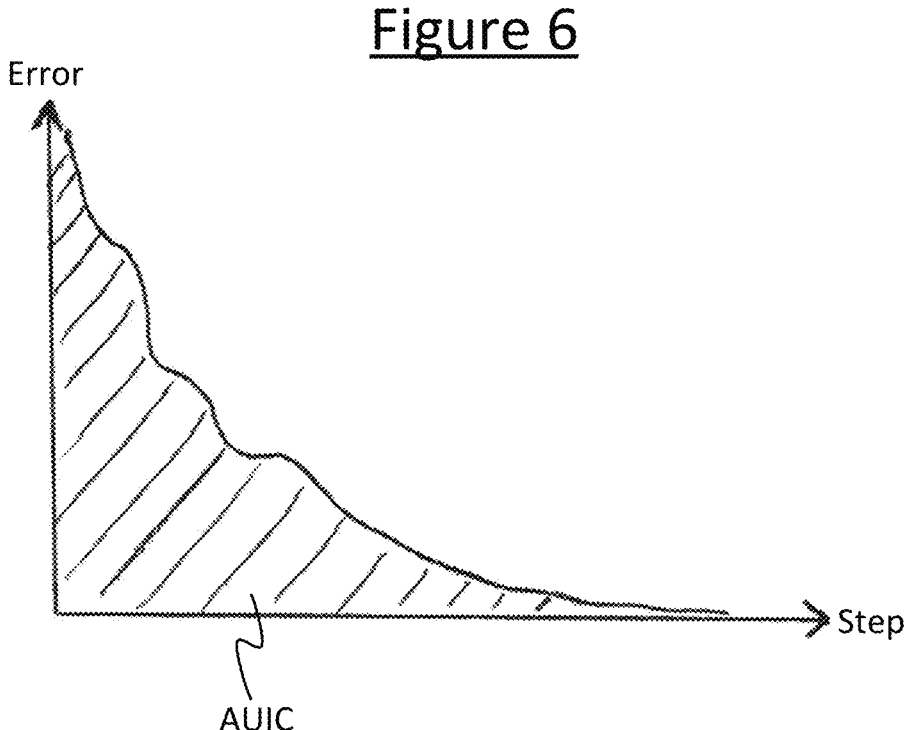
FIG. 6 is a sketch of prediction error vs. number of steps where at each step a new data point is collected.

The method may then be iterated over one or more iterations, each iteration comprising a respective learning step followed by a respective acquisition step. The number of learning steps may be referred to herein as N. The aim is to minimize the area under the information curve (AUIC), as shown in FIG. 6. The vertical axis represents a measure of error in prediction, and the horizontal axis represents the number of learning steps, where with each step the algorithm 206 will select another feature $x_{id}$ to request.

There are two parts to the overall disclosed model of FIG. 9A: firstly, the deep Bayesian generative model (referred to in embodiments as Bayesian Deep Latent Gaussian Model, BELGAM); and secondly, partially amortized inference (PA). Together these may be referred to as PA-BELGAM. The BELGAM part is what is shown in FIG. 9. The addition of the partial amortization, PA (the feedback of the partially observed X in an auto encoder arrangement) is what is added in FIG. 9A. The BELGAM alone is accurate but slow. Partial amortization alone is fast but not so accurate. Preferably the two parts are combined to achieve a model that is both accurate and fast to learn. This may also be referred to as nested approximate inference. In less preferred embodiments however, the BELGAM part (FIG. 9) could be used alone without forming an auto encoder as in FIG. 4 or 9A. In this case Z may be generated using other known techniques such as sampling.

Note also that the use of Gaussian distributions is only an example and the BELGAM could be implemented with other forms of probabilistic distribution to model the weights.

The model 208 may be used for either imputation or prediction. In the imputation case, there is no classification $Y_i$. Each data point comprises only the respective vector value of the feature vector $X_i$. The aim is to impute future values of the features of the feature vector X based on the observations of past values $X_o$. For example this could be used as a feature recommender to recommend features to a user.

In general the decoder $p(X|Z)$ can generate/decode all elements x, but during training only $p(X_o|Z)$ is evaluated based on $X_o$(the observed values of X). When observing only $X_o$ and not all of X, there is of course some uncertainty about the unobserved values $X_u$. Any imputation of $X_u$ is based on the relationships between elements of X the model has learned about during training. FIGS. 4 and 4A show the case for performing imputations or inferences regarding X. But the scope of the present disclosure also extends to the case where there is a separate Y.

For the imputation case, the expected uncertainty may be the difference between: the expected entropy of the posterior distribution $p(\theta|x_{id}, X_o)$ given the potential new feature $x_{id}$ and the observations $X_o$ so far, and the entropy of the posterior distribution $p(\theta|x_{id}, X_o)$ given the observations $X_o$ so far. Hence the reward function $R_I$, i.e. the expected reduction in the uncertainty, may be expressed as:

$$R_I = H[p(\theta|x_{id}, X_o)] - E_{xid}[H[p(\theta|x_{id}, X_o)]]$$

where H is the entropy and E is the expectation. In this case the acquisition module 210 is configured to find argmax $R_I(x_{id})$, i.e. find the value of $x_{id}$ that maximizes $R_I$.

In the case of prediction, each data point $X_i$ in at least the initial training data is labelled with a classification $Y_i$, and in embodiments each new data point is also labelled with a corresponding classification $Y_i$. The aim of the prediction is then to predict a value of the classification Y for a further, target value of the input vector X. for example this could be used to predict a condition of patient or other subject given a set of symptoms. In the prediction case the expected uncertainty may be expressed as:

$$R_C = (1-\alpha)R_I + \alpha R_P$$

where $\alpha$ is a predetermined factor (e.g. 0.5), and $R_P$ is the expectation of a measure of information I, $$R_P = E_{xid}[I(Y, \theta|x_{id})x_o]$$

where the subscript $X_o$ means conditional on $X_o$. The factor $\alpha$ may be set by the system designer. A preferred value may be determined experimentally. The authors have found that 0.5 works well.

In this case the acquisition module 210 is configured to find argmax $R_C(x_{id})$, i.e. find the value of $x_{id}$ that maximizes R.

It will be appreciated that these are just examples. In embodiments either of the above metrics could be evaluated in terms of an approximations. Further, other alternative metrics for measuring probabilistic uncertainty will, in themselves, be known in the art.

Some example applications of the disclosed techniques, as well as some particular example implementations, will now be discussed in more detail.

Frequently, medical doctors must treat patients experiencing discomfort with no obvious cause. To make a correct diagnosis and perform effective treatment, the doctor needs to carry out a sequence of medical tests. Performing each of these tests has a cost in terms of money, time, and health risks. An AI system could support a medical diagnosis by recommending the tests that enable an accurate diagnosis at a low cost. To this end, an AI system should be able to suggest the information to be acquired in the form of "one measurement (feature) at a time" to enable the accurate predictions (diagnosis). The above problem can be addressed by the sequential feature selection at test time as investigated in the recent works. We call this sequential feature selection for predicting the targets in test time as the test-time active prediction task.

Training an AI system to enable active prediction typically requires a large volume of data. Unfortunately, training data is typically challenging and costly to obtain. For example, new data needs to be collected by taking measurements of currently hospitalized patients with their consent. Thus, it is desirable to minimize the amount of the training data needed. To this end, we would like to deploy such a system from the beginning of the training process when no or only limited data is available, and to use the model to support the acquisition of the correct training data. We call this problem the ice-start problem. This is different from the traditional "cold-start" problem which only deals with the difficulty of predicting the metrics of new incoming patients rather than the scarcity of training data. Our approach to this ice-start problem is to propose a model that knows what it does not know. In this way, the model can be used to guide the acquisition of training data, e.g., it would prefer to acquire unfamiliar but informative feature elements over other familiar but uninformative ones. Thus, such an approach can reduce the cost of acquiring training data. We refer to this as element-wise training-time active acquisition.

Figure 8:
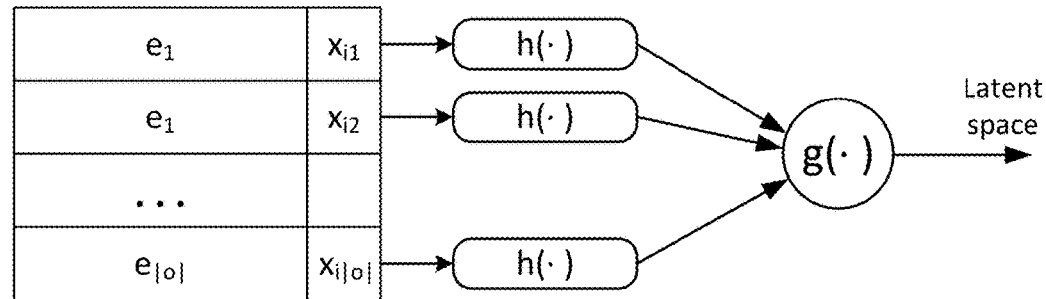
FIG. 8 is a schematic illustration of a P-VAE inference network structure.

FIG. 7 shows a flow diagram of an active training phase at time t-1 in accordance with embodiments disclosed herein. FIG. 8 gives an illustration of a P-VAE inference network structure in accordance with embodiments disclosed herein.

Training-time active acquisition is not only useful for the prediction tasks but also for any other task in which it is necessary to learn the underlying structure of the data. For example, in a recommender system, the aim is to predict user preferences based on their history of ratings. We refer to this as the imputation task. Arguably, an ideal approach should actively ask users to rate items to improve the imputation quality during the training process.

Despite the success of element-wise test-time active prediction, few works have tackled the problem of ice-start. An element-wise method needs to handle partial observations at any time. More importantly, we need to design new acquisition functions that takes the model parameter uncertainty into account.

In this work, we provide "Icebreaker", a principled framework to solve the ice-start problem. Icebreaker actively acquires informative feature elements during training and also perform active test prediction with small amount of data for training.

We propose a Bayesian deep Latent Gaussian Model (BELGAM). Standard training of the deep generative model cares about the point estimates for the parameters, whereas our approach applies a fully Bayesian treatment to the weights. Thus, during the training time acquisition, we can leverage the uncertainty about the weights.

We design a novel partial amortized inference method for BELGAM, naming PA-BELGAM. We combine recent advances in amortized inference for the local latent variables and stochastic gradient MCMC for the model parameters, i.e. the weights of the neural network, to ensure high inference accuracy.

We provide two training-time information acquisition functions based on the uncertainties modelled by PA-BELGAM to identify informative elements. One acquisition function is designed for imputation tasks, and the other for active prediction tasks.

We evaluate the disclosed PA-BELGAM as well as the entire Icebreaker approach on well-used machine learning benchmarks and a real-world health-care task. The method demonstrates clear improvements compared to multiple baselines and shows that it can be effectively used to solve the ice-start problem.

Assume at each acquisition step we have training data $D_{train}$, a pool data set $D_{pool}$, and $D_{train} \cup D_{pool} = X \in \mathbb{R}^{N \times D}$. In the ice-start scenario, $D_{train} = \emptyset$. $D_{pool}$ is the pool data that we can possibly acquire. At each step of the training-time acquisition, we actively select data points $x_{id} \in D_{pool}$ to acquire, thereby moving them into Dtrain and updating the model with the newly formed $D_{train}$. FIG. 7 shows the flow diagram of this procedure. During the process, at any step, there is an observed data set $X_O$ and unobserved set $X_U$ with |O| and |U| number of rows respectively. For each (partially observed) data instance $x_i \in X_O$, we the observed index set $O_i$ containing index of observed features for row i. If the data set has a clear target variable, we denote the target as Y. In this case, each $x_i \in X_O$ has a corresponding target $y_i$.

In this project, we consider two test tasks with test set $D_{test}$. The first task (i) is imputation: we have $X_O^* \cup X_U^* = D_{test}$ and an evaluation metric $f(\cdot)$, e.g., negative log likelihood. The task is to evaluate the performance $f(X_U^*)$ given $X_O^*$. The second task (ii) is active prediction: we have an additional target set $Y^*$. At each test time query, a single feature $x_{id}^* \in X_U^*$ for each row i is moved into $X_O$. The goal is to achieve better target prediction $f(Y^*)$ conditioned on $X_O^*$ with minimal data queries.

Bayesian Deep Latent Gaussian Model (Belgam)

Figure 10A:
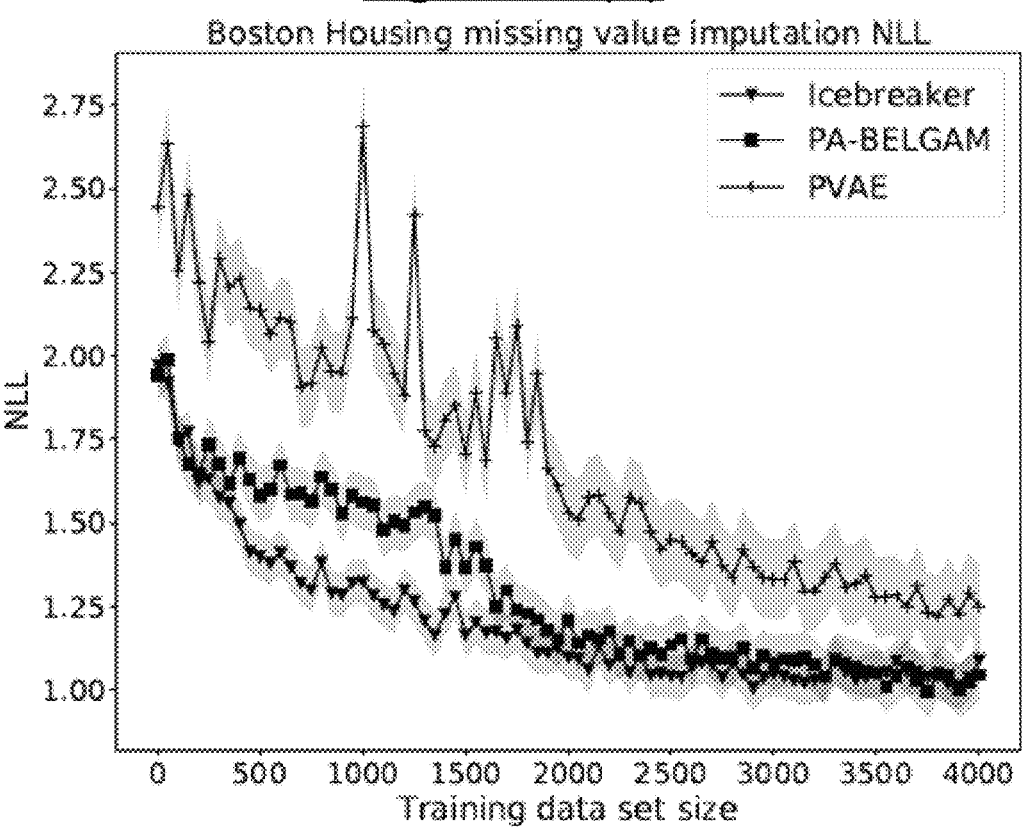
FIGS. 10(a)-(c) are plots of some Boston Housing experimental results.
Figure 10B:
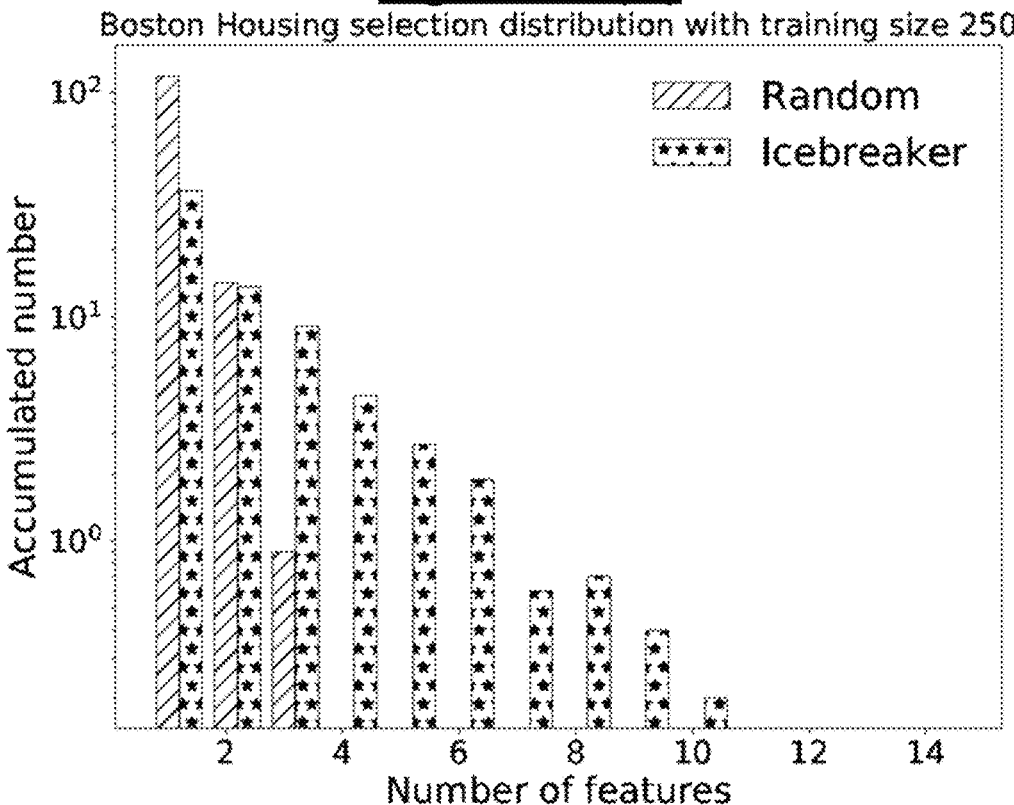
Figure 10C:
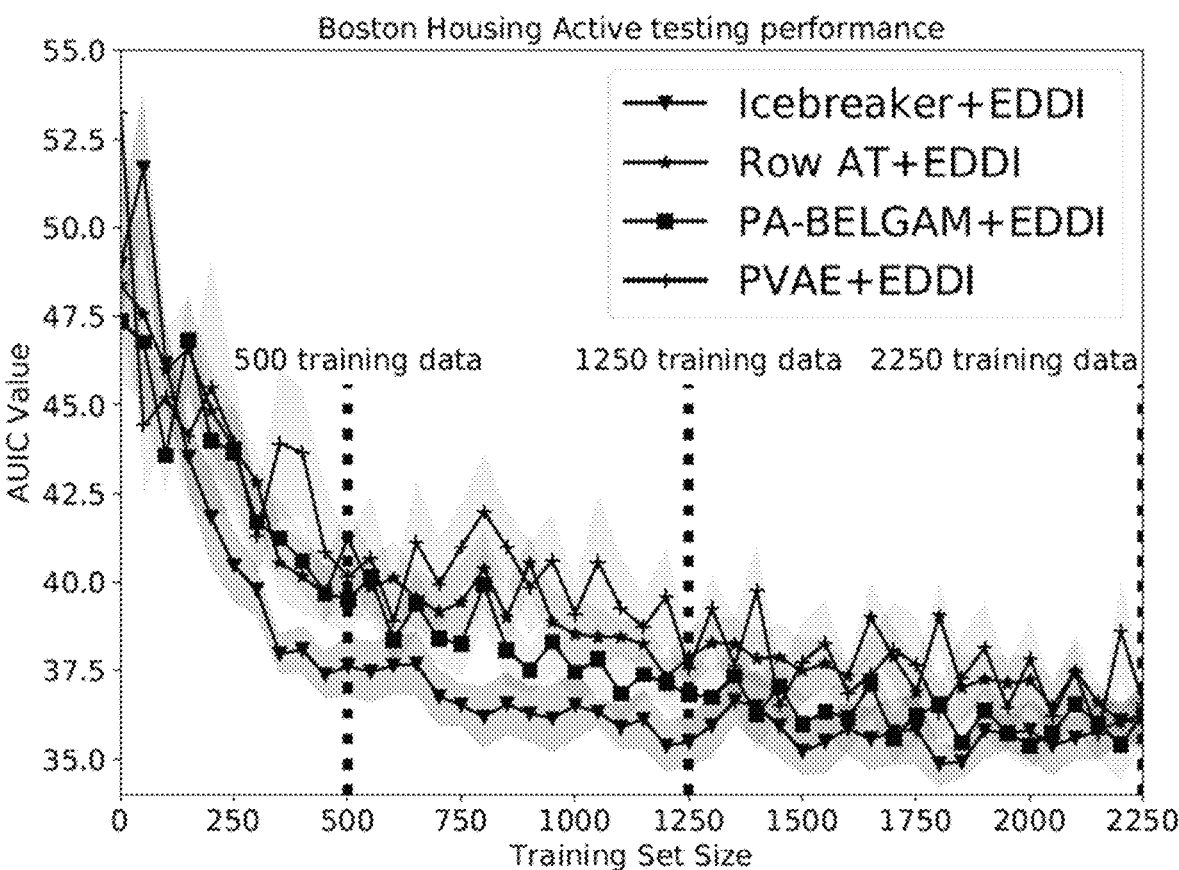

To build Icebreaker, the first step is to design a flexible full Bayesian model which provides the model uncertainty quantification. A Bayesian latent variable generative model as shown in FIG. 10 is a common choice, but previous work of such models are typically linear and not flexible enough to model highly complex data. A Deep Latent Gaussian Model which uses a neural network mapping is flexible but not fully Bayesian as the uncertainty of the model itself is ignored. We thus propose a Bayesian Deep Latent Gaussian Model (BELGAM), which uses a Bayesian neural network to generate observations $X_O$ from local latent variables Z with global latent weights $\theta$. The model is thus defined as:

$$p(X_O, \theta, Z) = p(\theta) \prod_{i=1}^{|O|} \prod_{d \in O_i} p(x_{id}|z_i, \theta) p(z_i), \quad (1)$$

The goal is to infer the posterior, $p(\theta, Z|X_O)$, for both local latent variable $Z = [z_1, \ldots z_{|o|}]$ and global latent weights $\theta$. Such a model is generally intractable and approximate inference is needed. Variational inference (VI) and sampling-based methods are two types of approaches used for this task. Sampling-based approaches are known for accurate inference performances and theoretical guarantees.

However, sampling the local latent variable Z is computationally expensive as the cost scales linearly with the data set size. To best trade off the computational cost against the inference accuracy, we disclose to amortize the inference for Z and keep an accurate sampling-based approach for the global latent weights $\theta$. Specifically, we use preconditioned stochastic gradient Hamiltonian Monte Carlo (SGHMC).

Partial Amortized Belgam

Revisiting amortized inference and its application in the presence of missing data: Amortized inference is an efficient extension for variational inference. It was originally proposed for deep latent Gaussian models where only local latent variables Z need to be inferred. Instead of using an individually parametrized approximation $q(z_i)$ for each data instance $x_i$, amortized inference uses a deep neural network as a function estimator to compute $q(z_i)$ using xi as input, $q(z_i|x_i)$. Thus, the estimation of the local latent variable does not scale with data set size during model training.

However, in our problem setting, the feature values for each data instance are partially observed. Thus, the vanilla amortized inference cannot be used as the input dimensionality to the network can vary for each data instance. With partial VAE, we adopt the set encoding structure to build the inference network to infer Z based on partial observations in a amortized manner.

As shown in FIG. 8, for each data instance $x_i \in X_O$ with $|O_i|$ observed features, the input is modified as $S_i=[s_{i1}, \ldots, s_{i|o_i|}]$ where $s_{id}=[x_{id}, e_d]$ and $e_d$ is the feature embedding. This is fed into a standard neural network $h(\bullet): \mathbb{R}^{M+1} \to \mathbb{R}^K$ where M and K are the dimensions of the latent space and $e_d$ respectively. Finally, a permutation variant set function $g(\bullet)$ is applied. In this way, we build an inference network structure that is compatible with partial observations.

Amortized inference+SGHMC: As discussed previously, we want to be computationally efficient when inferring Z and be accurate when inferring the global latent weights $\theta$ for BELGAM. Thus, we start with VI and then nest SGHMC into it. Assume we have the factorized approximated posterior $q(\theta, Z|X_O) \approx q(\theta|X_O)q_o(Z|X_O)$, the proposed inference scheme can be summarized into two stages: (i) sample $\theta \sim q(\theta|X_O)$ using SGHMC, and (ii) update the amortized inference network $q_o(z_i|x_i)$ to approximate $p(z_i|x_i)$.

First, we present how to sample $\theta \sim q(\theta|X_O)$ using SGHMC. The optimal form for $q(\theta|X_O)$ can be defined as $$q(\theta \mid X_O) = \frac{1}{C} e^{\log p(X_O, \theta)}$$

where C is the normalization constant $p(X_O)$. In order to sample from such optimal distribution, the key is to compute the gradient $\nabla_\theta \log p(X_O, \theta)$. Unfortunately, this is intractable due to marginalizing the latent variable Z.

Instead, we disclose to approximate this quantity by transforming the marginalization into an optimization:

$$\log p(X_O, \theta) \geq \Sigma_{i \in x_O} \mathbb{E}_{q_\phi(z_i|x_i)}[\log p(x_i|z_i, \theta)] - KL[q_\phi(z_i|x_i)\|p(z_i)] + \log p(\theta). \quad (2)$$

Therefore, the marginalization of Z is transformed into an optimization problem $$\nabla_\theta \log p(X_O, \theta) = \quad (3)$$

$$\nabla_\theta \max_{q_\phi \in \mathcal{F}} \sum_{i \in X_O} \mathbb{E}_{q_\phi(z_i|x_i)}[\log p(x_i \mid z_i, \theta)] - KL[q_\phi(z_i \mid x_i)\|p(z_i)] + \log p(\theta)$$

where F is a sufficiently large function class.

After sampling $\theta$, we update the inference network with these samples by optimizing:

$$\mathcal{L}(X_O; \phi) =$$

$$\mathbb{E}_{q(\theta, Z|X_O)}[\log p(X_O \mid Z, \theta)] - KL[q(Z, \theta \mid X_O)\|p(Z, \theta)] = \mathbb{E}_{q(\theta|X_O)}\Bigg[$$

$$\sum_{i \in X_O} \mathbb{E}_{q_\phi(z_i|x_i)}[\log p(x_i \mid z_i, \theta)] - KL[q_\phi(z_i \mid x_i)\|p(z_i)]\Bigg] - KL[q(\theta \mid X_O)\|p(\theta)]$$

where the outer expectation can be approximated by SGHMC samples. The resulting inference algorithm resembles an iterative update procedure, like Monte Carlo Expectation Maximization (MCEM) where it samples latent Z and optimizes $\theta$ instead. We call the proposed model Partial Amortized BELGAM (PA-BELGAM). Partial VAE is actually a special case of PA-BELGAM, where $\theta$ is a point estimate instead of samples.

Note that, in this way, the computational cost with single chain SGHMC is exactly the same as training a normal VAE thanks to the amortization for Z. Thus, PA-BELGAM scales to large data when needed. The only additional cost is the memory for storing_samples. Thus, we adopt a similar idea based on the Moving Window MCEM algorithm, where samples are stored and updated in a fixed size pool with a first in first out (FIFO) procedure.

Active Information Acquisition for Icebreaker

Based on the proposed PA-BELGAM, we design two training time acquisition objectives for the imputation and prediction tasks separately. Unfortunately, the objective function for test-time feature selection, like EDDI does not apply here as it assumes that the model has been well trained. The ideal acquisition should balance the reduction of the model uncertainty and performance of the desired task.

Icebreaker for missing data imputation Imputing missing values is important to applications such as recommender systems and other down-stream tasks. In this setting, the goal is to learn about all the features elements (item user pairs in the recommender system setting) as quickly as possible. This can be formalized as selecting the elements $x_{id}$ that maximizes the expected reduction in the posterior uncertainty of $\theta$:

$$R_I(x_{id}, X_O) = H[p(\theta|X_O)] - \mathbb{E}_{p(x_{id}|X_O)}[H[p(\theta|X_O, x_{id})]] \quad (4)$$

We use the symmetry of mutual information to sidestep the posterior update $p(\theta|X_O, x_{id})$ and entropy estimation of $\theta$ for efficiency. Thus, Eq. 4 is written as $$R_I(x_{id}, X_O) = H[p(x_{id}|X_O)] - \mathbb{E}_{p(\theta|X_O)}[H[P(x_{id}|\theta, X_O)]] \quad (5)$$

We can approximate Eq. 5 as $$R_I(x_{id}, X_O) \approx -\frac{1}{K}\sum_k \log \frac{1}{MN} \sum_{m,n} p(x_{id}^k \mid z_i^m, \theta^n) + \quad (6)$$

$$\frac{1}{NK}\sum_{k,n} \log \frac{1}{M} \sum_m p(x_{id}^k \mid z_i^m, \theta^n)$$

based on the samples $\{\theta^n\}^N_{n=1}$, $\{Z_i^m\}^M_{m=1}$, $\{x_{id}^k\}^K_{k=1}$ from SGHMC, the amortized inference network and the data distribution respectively. The sample $x_{id}\sim p(x_{id}|X_O)$ can be generated in the following way: (i) $z_i\sim q_\phi(z_i|x_{io})$, (ii) $\theta\sim q$ $(\theta|X_O)$, (iii) $x_{id}\sim p(x_{id}|\theta, z_i)$.

Icebreaker for active target prediction: For the prediction task, solely reducing the model uncertainty is not optimal as the goal is to predict the target variable Y. In this context, we require the model to: (1) capture the correlations and accurately impute the unobserved feature values in the pool set because during the test time sequential feature selection, the model needs to estimate the candidate missing element $x_{id}$ for decision making; and (2) find informative feature combinations and learn to predict the target variable. Thus, the desired acquisition function needs to trade-off exploring different features to learn their relationships against learning a predictor by exploiting the informative feature combinations. We disclose the following objective:

$$R_P(x_{id},X_O)= \mathbb{E}_{p(x_{id}|X_O)}[H[p(\mathcal{Y}_i|x_{id},X_O)]]- \mathbb{E}_{p(\theta,z_{id}|X_O)}$$
$$[H[p(\mathcal{Y}_i|\theta,x_{id},X_O)]]. \tag{7}$$

The above objective is equivalent to conditional mutual information $I(y_i, \theta|x_{id},X_O)$. Thus, maximizing it is the same as maximizing the information to predict the target $y_i$ through the model weights $\theta$, conditioned on the observed features $X_O$ with this additional feature $x_{id}$. In our case, the $x_{id}$ is unobserved. As the weights $\theta$ do not change significantly over one feature element, we assume $p(\theta|X_O)\approx p$ $(\theta|X_O, x_{id})$ when estimating the objective for computational convenience.

Similar to Eq.6, we approximate this objective using Monte Carlo integration:

$$R_P(x_{id}, X_O) \approx -\frac{1}{JK}\sum_{j,k}\log\frac{1}{MN}\sum_{m,n}p(\mathcal{Y}_i^{(j,k)}\mid z_i^{(m,k)}, \theta^n) + \tag{8}$$
$$\frac{1}{KNJ}\sum_{j,n,k}\log\frac{1}{M}\sum_m p(\mathcal{Y}_i^{(j,k)}\mid z_i^{(m,k)}, \theta^n)$$

where we draw $\{z_i^{(m,k)}\}^M_{m=1}$ from $q_\phi(z_i|X_O, x_{id}^k)$ for each imputed sample $x_{id}^k$. Others $(\{\theta^n\}^N_{n=1}, \{y_i^{(j,k)}\}^J_{j=1}$, and $\{x_{id}^k\}^K_{k=1})$ are sampled in a similar way to the imputation task.

This objective naturally balances the exploration among features as well as the exploitation to find informative ones for the prediction task. For example, if feature $x_{id}$ is less explored or uninformative about the target, the first entropy term in Eq.7 will be high, which encourages the algorithm to pick this unfamiliar data. However, using this term alone can result in selecting uninformative/noisy features. Thus, a counter-balance force for exploitation is needed, which is exactly the role of the second term. Unless $x_{id}$ together with $\theta$ can provide extra information about the target $y_i$, the entropy in the second term with uninformative features will still be high. Thus, the two terms combined together encourage the model to select the less explored but informative features. The proposed objective is mainly targeted at the second requirement mentioned at the beginning of this section. However, its effectiveness depends heavily on the imputing quality of $x_{id}$. Thus, a natural way to satisfy both conditions is a combination of the two objectives:

$$R_C(x_{id},X_O)=(1-\alpha)R_I(x_{id},X_O)+\alpha R_P(x_{id},X_O) \tag{9}$$

where $\alpha$ controls which task the model focuses on. This objective also has an information theoretic interpretation.

When $\alpha=0.5$, this combined objective is equivalent to the mutual information between $\theta$ and the feature-target pair $(x_{id}, y_i)$.

EXPERIMENTS

We evaluate Icebreaker first on machine learning benchmark data sets from UCI [6] on both imputation and prediction tasks. We then evaluate it in two real-world applications: (a) movie rating imputation using MovieLens, and (b) risk prediction in intensive care using MIMIC.

EXPERIMENTS SETUP AND EVALUATION

We compare the Icebreaker with random feature acquisition strategy for training where both P-VAE and PA-BELGAM are used. For the imputation task, P-VAE already achieves excellent results in various data sets compared to traditional methods. Additionally for the active prediction task, we compare the Icebreaker to the instance-wise active learning, denoted as Row AT, where the data are assumed to be fully observed apart from the target.

We evaluate the imputation performance by reporting NLL over the test target. For the active prediction task, we use EDDI to sequentially select features at test time. We report the area under information curve (AUIC) for the test set (See FIG. 11 for example). A smaller value of AUIC indicates better overall active prediction performance. All experiments are averaged over 10 runs.

FIG. 10: Boston Housing experimental results. (a) The test negative log likelihood (NLL) over number of training data elements. (b) The distribution of the number of the feature for data instance during the training time. (c) Performance of the active prediction task over number of training data elements. The test time active prediction curves with the training data size indicated by black dash line are shown in FIG. 11

Figure 11:
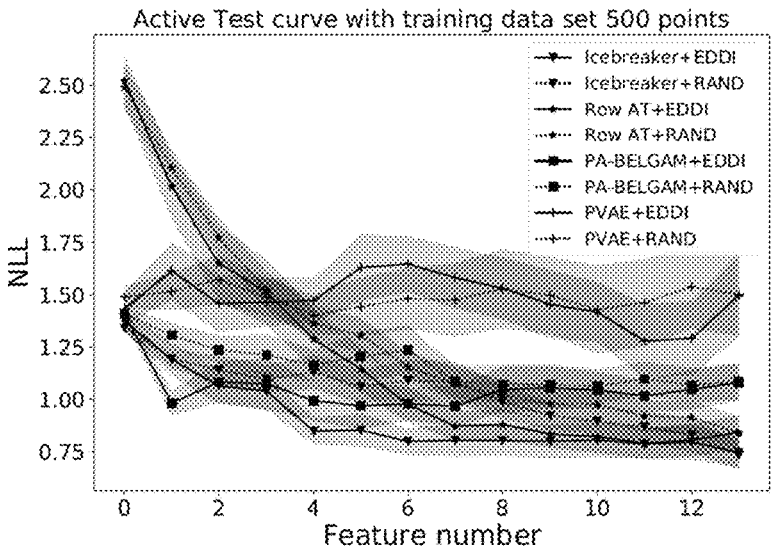
FIG. 11 shows some plots of test time performance after exposure to different numbers of training data.
Figure 11:
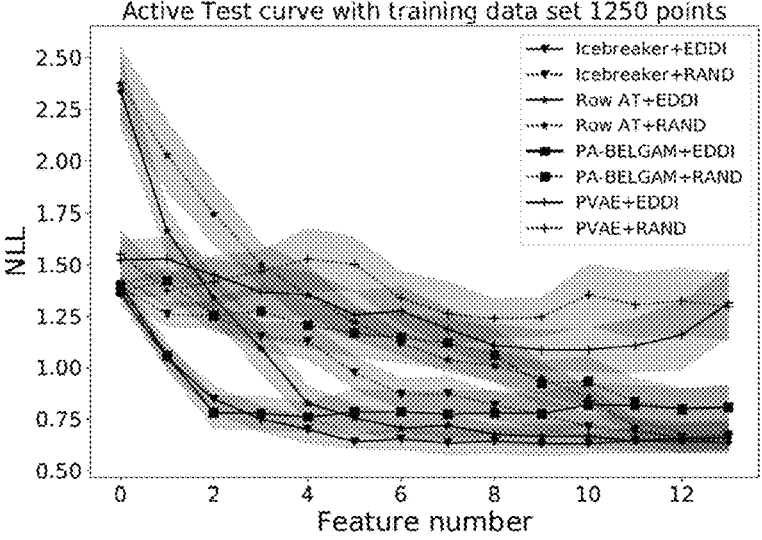
Figure 11:
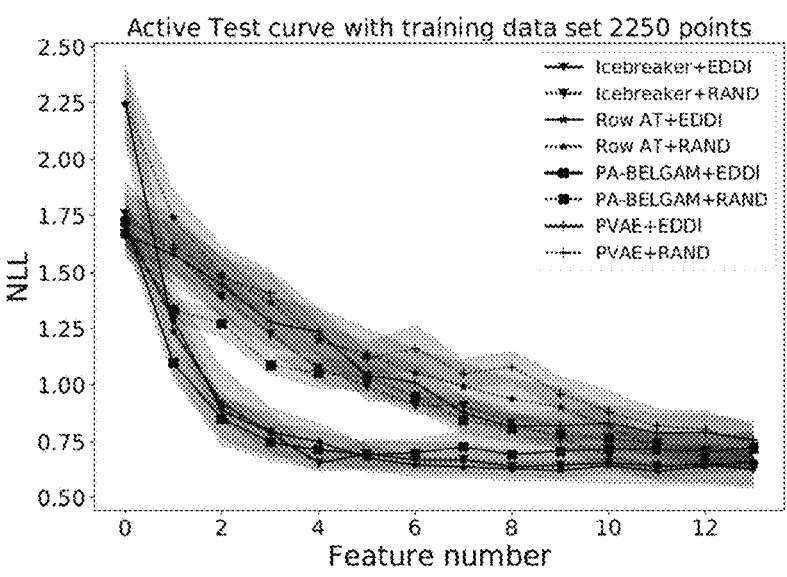

FIG. 11: Evaluation of test time performance after exposure to different number of training data. (Top) 550 feature elements. (Middle) 1250 feature elements (Bottom): 2250 feature elements. The x-axis indicates the number of features elements used for prediction. Legend indicates the methods used for training (Icebreaker, Row AT, etc.) and test time acquisition (EDDI, RAND).
UCI Data Set Imputation Task: At each step of Icebreaker we select 50 feature elements from the pool. FIG. 10(a) shows the NLL on the test set as the training set increases. Icebreaker outperforms random acquisition with both PA-BELGAM and P-VAE by a large margin, especially at early stages of training. In addition, we see that PA-BELGAM alone can be beneficial compared to P-VAE with small data set. This is because P-VAE tends to over-fit, while PA-BELGAM leverages the model uncertainties.

We also analyse the feature selection pattern of the Icebreaker. We gather all the rows that have been queried with at least one feature during training acquisition and count how many features are queried for each. We repeat this for the first 5 acquisitions. FIG. 10(b) shows the histogram of the number of features acquired for each data point. The random selection concentrates around 1 feature per data instance. However, the long-tailed distribution of the number of selected features of Icebreaker means it tends to exploit the correlations between features inside certain rows but simultaneously tries to spread its selection for more exploration. Including the imputation results on other UCI data sets, we find that Icebreaker consistently outperforms the baseline by a large margin.

Prediction Task: For the active prediction task, FIG. 10(*c*) shows the AUIC curve as the amount of training data increases. The Icebreaker clearly achieves better results at the early stage compared to all baselines (Also confirmed by FIG. 11). This shows that it not only has a more accurate prediction of the targets but also captures correlations between features and targets. Interestingly, the baseline Row AT performs a little worse than PA-BELGAM. We argue this is because it is wasteful to query the whole row, especially with a fixed query budget. Thus, it will form a relatively small but complete data set. Again, the uncertainty of PA-BELGAM brings benefits compared to P-VAE with point estimated parameters.

We confirm our guess by plotting the active test NLL curve as in FIG. 11. At the early training stage (500 data points, top panel in FIG. 11), the performance of Row AT is worse in the test time than others when few features are selected. This is due to obtaining a complete observed datum is costly. With the budget of 500 feature element, it can only select 50 fully observed data instances. In contrast, Icebreaker has obtained 260 partially observed instances with different level of missingness. As more features are selected during test, these issues are mitigated and the performance starts to improve. Further evidence suggests that, as the training data grows, we can clearly observe a better prediction performance of Row AT the early test stage.

Recommender System Using Movielens

Figure 12A:
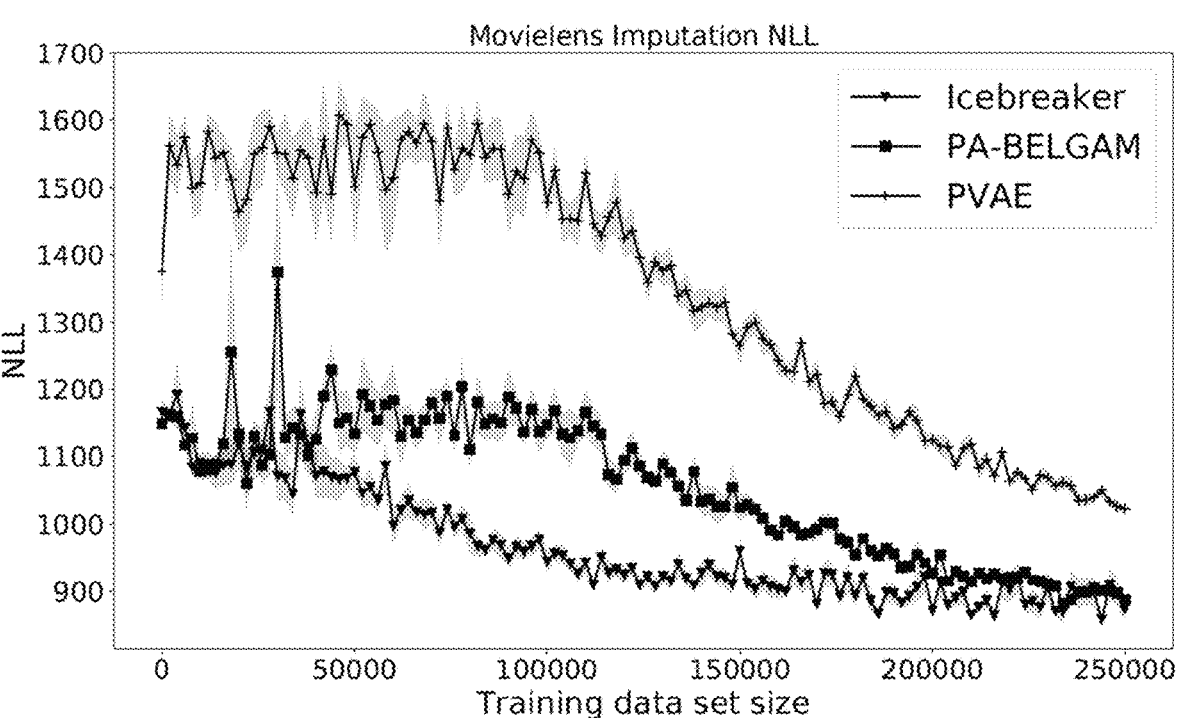
FIGS. 12(a)-(b) are some plots of recommender performance using MovieLens.
Figure 12B:
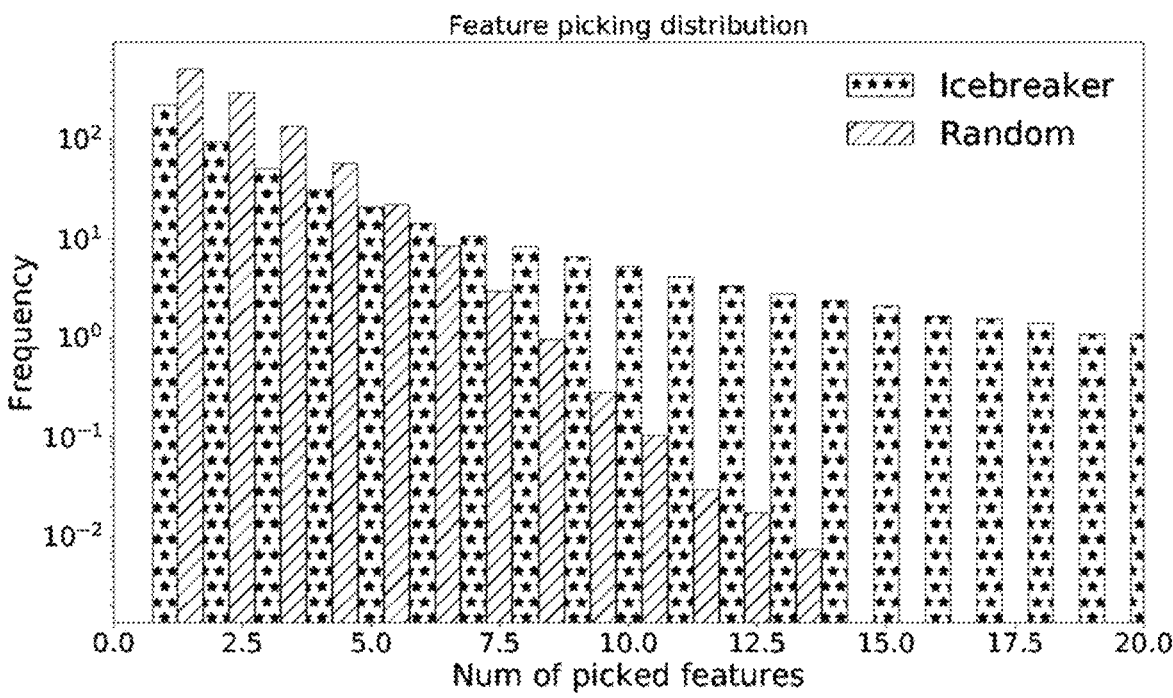

One common benchmark data set for recommender systems is MovieLens-1M. P-VAE has obtained the state-of-the-art imputation performance after training with sufficient amount of data. FIG. 12 shows recommender performance using MovieLens. Panel (a) shows the NLL on the test set. Panel (b) shows the distribution of the number of features selected for each user).

FIG. 12(*a*) shows the performance on predicting unseen items in terms of NLL. Icebreaker shows that with minimum data, the model has learned to predict the unseen data. Given any small amount of data, Icebreaker obtains the best performance at the given query budget, followed by PA-BELGAM which outperforms P-VAE. The selection pattern is similar to the UCI imputation, shown in FIG. 12(*b*). We argue this long tail selection is important especially when each row contains many features. The random selection tends to scatter the choices and is less likely to discover dependencies until the data set grows larger. But if there are many features per data instance, this accumulation will take very long time. On the other hand, the long-tailed selection exploits the features inside certain rows to discover their dependencies and simultaneously tries to spread out the queries for exploration.

Mortality Predicting Using Mimic

Figure 13:
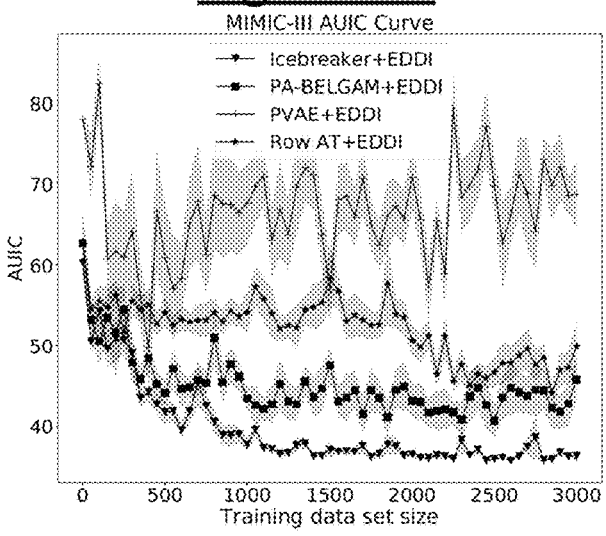
FIG. 13 shows some plots of performance of MIMIC experiments.
Figure 13:
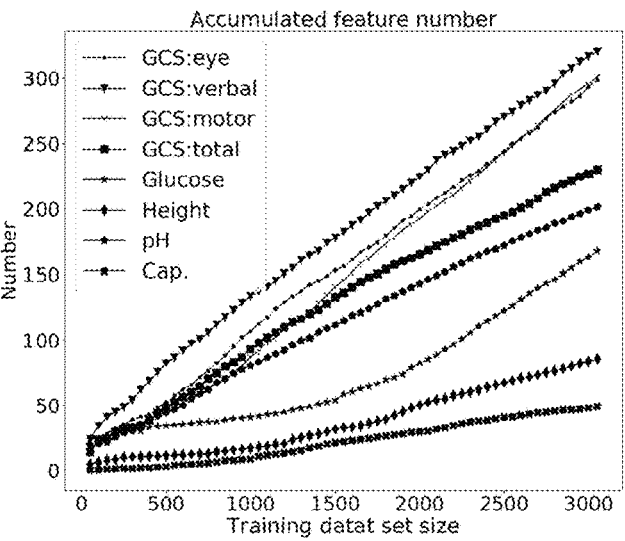
Figure 13:
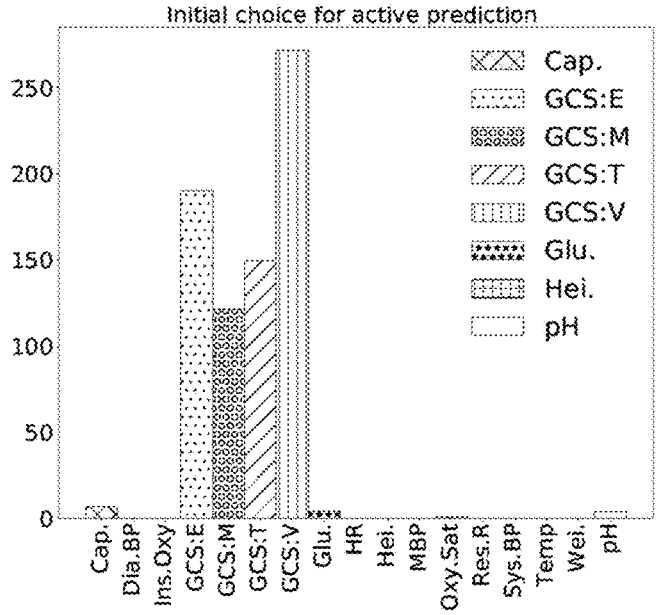

We apply the Icebreaker to a health-care application using the Medical Information Mart for Intensive Care (MIMIC III) data set. This is the largest real-world healthcare data set in terms of the patient number. The goal is to predict the mortality based on the 17 medical measurements. The data is pre-processed following and balanced. FIG. 13 shows the performance of MIMIC experiments. (Top) This figure shows the predictive AUIC curve as training data size increases. (Middle) The accumulated feature statistics as active selection progresses. (Bottom) This indicates the histogram of initial choice during active prediction using EDDI.

The top panel in FIG. 13 shows that the Icebreaker outperforms the other baselines significantly with higher robustness (smaller std. error). Robustness is crucial in health-care settings as the cost of unstable model performance is high. Similarly, Row AT performs more poorly until it accumulates sufficient data. Note that without active training feature selection, PA-BELGAM performs better than-VAE due to its ability to model uncertainty given this extremely noisy data set.

To evaluate whether the proposed method can discover valuable information, we plot the accumulated feature number in the middle panel of FIG. 13. The x-axis indicates the total number of points in the training set and each point on the curve indicates the feature selection number in the training set. We see that not only different features have been collected at different frequency, the curve of the accumulated feature such as Glucose is clearly non-linear as well. This indicates that the importance of different feature varies at different training phases. Icebreaker is establishing a sophisticated feature element acquisition scheme where no heuristic method can achieve. The top 3 features are the Glasgow coma scale (GCS). These features have been identified previously as being clinically 269 important (e.g. by the IMPACT model). Glucose is also in the IMPACT set. It was not collected frequently in the early stage, but in the later training phase, more Glucose has been selected. Compare to GCS, Glucose has a highly non-linear relationship with the patient outcome. Icebreaker chooses more informative features with simpler relationship in the very early iteration. While the learning progresses, Icebreaker is able to identify these informative features with complex relationship to the target. Additionally, the missing rate for each feature in the entire data set differs. Capillary refill rate (Cap.) has more than 90% data missing, much higher than Height. Icebreaker is still able to pick the useful and rarely observed information, while only chooses a small percent of the irrelevant information during the test. On the right hand side of FIG. 13, we plot the histogram of the initial choices during test-time acquisition. GCS are selected the most in the first step as it is the most informative feature.

It will be appreciated that the above embodiments have been described by way of example only.

More generally, according to one aspect disclosed herein, there is provided a method of training a model comprising one or more neural networks including at least a generative network, the generative network having a latent vector as an input vector and a feature vector as an output vector, each element of the feature vector representing a different one of a set of features, wherein weights applied by at least some nodes in the generative network are each modelled as a probabilistic distribution. The method comprises: a) obtaining one or more observed data points, each comprising a respective subset of feature values, wherein within each subset, each feature value is a value of a corresponding one of a subset of the features in the feature vector; and b) training the model based on the observed data points to learn values of the weights of the generative network which map the latent vector to the feature vector. The method further comprises: c) from amongst a plurality of potential next features to observe, searching for a target feature of the feature vector which maximizes a measure of expected reduction in uncertainty in a distribution of said weights of the generative network given the observed data points so far; and d) outputting a request to collect a target data point comprising at least the target feature.

The potential next features, amongst which the search is performed, may be a plurality of as-yet unobserved features not yet observed in the one or more data points.

The distribution of the weights given the observed data points may be referred to as a posterior distribution of the weights, or the uncertainty may be referred to as the posterior uncertainty.

In embodiments, the request may comprise a message requesting a human user or group of human users to collect the target data point.

Alternatively the request may comprise a signal to an automated process requesting the automated process to collect the target data point.

In embodiments, at least some connections between nodes in the generative network may be each modelled as a probabilistic distribution.

In embodiments, neural networks of the model may further include an inference network having the feature vector as an input vector and the latent vector as an output vector, the inference network and generative network thus forming an encoder and decoder respectively of a variational auto encoder; and the training further comprises learning weights of the inference network which map the feature vector to the latent vector.

In embodiments, the weights applied by at least some nodes in the inference network may each be modelled as a probabilistic distribution.

In embodiments, at least some connections between nodes in the inference network may each be modelled as a probabilistic distribution.

In embodiments, the method may comprise: e) receiving the target data point in response to said signal, and further training of the model based on the received target data point.

In embodiments, the method may comprise repeating a)-e) over multiple iterations, each iteration including the received target data point from the previous iteration amongst the observed data points.

In embodiments, the method may further comprise using the model to impute one or more of the features values of a further data point after one or more of the iterations of said further training.

In embodiments, the measure of uncertainty may comprise a measure of: a difference between i) an entropy of said distribution given the observed data points and ii) an expectation of the entropy given the input observed data points and the potential feature.

In embodiments, the measure of said difference may comprise a measure of $R_I$ where:

$$R_I(x_{id},X_O) = H[p(\theta|X_O)] - \mathbb{E}_{p(x_{id}|X_O)}[H[p(\theta|X_O,x_{id})]]$$

where H is the entropy, $E_p$ is the expectation, p is said distribution, $X_O$ is a vector of the observed data points, $\theta$ is a vector of the weights of the generative network, and $x_{id}$ is the feature value of feature d of the feature vector in data point i.

In embodiments, said measure of $R_I$ may be computed as:

$$R_I(x_{id},X_O) = H[p(x_{id}|X_O)] - \mathbb{E}_{p(\theta|X_O)}[H[p(x_{id}|\theta,X_O)]]$$

As an approximation said measure of $R_I$ may be computed as:

$$R_I(x_{id}, X_O) \approx$$

$$-\frac{1}{K}\sum_k \log \frac{1}{MN}\sum_{m,n} p(x_{id}^k \mid z_i^m, \theta^n) + \frac{1}{NK}\sum_{k,n}\log\frac{1}{M}\sum_m p(x_{id}^k \mid z_i^m, \theta^n)$$

In embodiments, each of the observed data points may be labelled with a classification.

In embodiments, the received target data point may be labelled with a classification.

In embodiments, the method may comprise using the model to predict a classification of a further data point after one or more of the iterations of said further training.

In embodiments, said measure of uncertainty may comprise a measure of a combination of:

a difference between i) an entropy of said distribution given the observed data points and ii) an expectation of the entropy given the input observed data points and the potential feature; and a measure of conditional mutual information in the weights of the generative network and a predicted classification given the observed data points and the potential feature.

In embodiments, said measure of mutual information may comprise a measure of $R_P$ where:

$$R_P(x_{id},X_O) = \mathbb{E}_{p(x_{id}|X_O)}[H[p(\mathcal{Y}_i|x_{id},X_O)]] - \mathbb{E}_{p(\theta,x_{id}|X_O)}$$
$$[H[p(\mathcal{Y}_i|\theta,x_{id},X_O)]]$$

where H is the entropy, $E_p$ is the expectation, p is said distribution, $X_O$ is a vector of the observed data points, $\theta$ is a vector of the weights of the generative network, and $x_{id}$ is the feature value of feature d of the feature vector in data point i, and $y_i$ is a predicted classification.

In embodiments, as an approximation said measure of $R_p$ may be computed as:

$$R_P(x_{id}, X_O) \approx -\frac{1}{JK}\sum_{j,k}\log\frac{1}{MN}\sum_{m,n}p(\mathcal{Y}_i^{(j,k)} \mid z_i^{(m,k)}, \theta^n) +$$
$$\frac{1}{KNJ}\sum_{j,n,k}\log\frac{1}{M}\sum_m p(\mathcal{Y}_i^{(j,k)} \mid z_i^{(m,k)}, \theta^n).$$

In embodiments, said measure may comprise a measure of $R_C$ where:

$$R_C(x_{id},X_O) = (1-\alpha)R_I(x_{id},X_O) + \alpha R_P(x_{id},X_O)$$

where $\alpha$ is a predetermined coefficient, and $$R_I(x_{id},X_O) = H[p(\theta|X_O)] - \mathbb{E}_{p(x_{id}|X_O)}[H[p(\theta|X_O,x_{id})]].$$

E.g. in embodiments a may be 0.5. More generally the coefficient $\alpha$ may be tuned by the system designer.

According to another aspect disclosed herein, there is provided a computer program embodied on computer-readable storage, the program comprising code configured so as when run on one or more processors to perform the operations of any method disclosed herein.

According to another aspect disclosed herein, there is provided a computer system comprising: storage comprising one or more memory units, and processing apparatus comprising one or more processing units; wherein the storage stores code arranged to run on the processing apparatus, the code being configured so as when thus run to perform the operations of any of the methods disclosed herein.

Other variants and applications of the disclosed techniques may become apparent to a skilled person once given the disclosure herein. The scope of the present disclosure is not limited by the described embodiments but only by the accompanying claims.

The invention claimed is:

1. A computer-implemented method comprising:

obtaining an observed data point comprising a feature value, the feature value being a value of a corresponding feature in a feature vector;

training a generative network based on the observed data point, wherein weights θ of the generative network are modeled by a probabilistic distribution;

from amongst a plurality of potential unobserved features to observe, searching for a target feature that maximizes, based on the observed data point, a measure of expected reduction in uncertainty in a posterior distribution $p(\theta|X_o)$ of the weights θ of the generative network, wherein:

the posterior distribution $p(\theta|X_o)$ is conditioned on the observed data point; and the measure of expected reduction in uncertainty comprises a combination of:

a measure of conditional mutual information in the weights θ of the generative network; and a predicted classification, the predicted classification being based on the observed data point and the potential unobserved features;

requesting observation of a target data point comprising a value of the target feature;

receiving the target data point in response to the requesting; and further training the generative network based on the received target data point, thereby updating the posterior distribution $p(\theta|X_o)$.

2. The method of claim 1, wherein the weights θ of the generative network correspond to a quantity of connections between nodes of the generative network.

3. The method of claim 1, wherein the requesting of the observation of the target data point includes requesting an automated process to collect the target data point.

4. The method of claim 1, wherein the generative network further includes an inference network having the feature vector as an input vector and a latent vector as an output vector, the inference network and the generative network forming an encoder and decoder respectively of a variational auto encoder, wherein the training further comprises learning weights of the inference network which map the feature vector to the latent vector.

5. The method of claim 4, wherein the weights of the inference network applied by a node in the inference network are modelled as a probabilistic distribution.

6. The method of claim 4, wherein a quantity of connections between nodes in the inference network is modelled as a probabilistic distribution.

7. The method of claim 1, further comprising:

repeating multiple iterations of the further training, each iteration including the received target data point from a previous iteration amongst the observed data point; and using the generative network to impute the feature value of a further data point after each iteration of the further training.

8. The method of claim 1, wherein of the observed data point is labelled with a classification.

9. A computer comprising:

a processor;

a memory device storing computer-executable code that, in response to execution by the processor, cause the processor to:

obtain an observed data point comprising a feature value, the feature value being a value of a corresponding feature in a feature vector;

train a generative network based on the observed data point, wherein weights θ of the generative network are modeled by a probabilistic distribution;

from amongst a plurality of potential unobserved features to observe, search for a target feature that maximizes, based on the observed data point, a measure of expected reduction in uncertainty in a posterior distribution $p(\theta|X_o)$ of the weights θ of the generative network, wherein:

the posterior distribution $p(\theta|X_o)$ is conditioned on the observed data point; and the measure of expected reduction in uncertainty comprises a combination of:

a measure of conditional mutual information in the weights of the generative network; and a predicted classification, the predicted classification being based on the observed data point and the potential unobserved features;

request observation of a target data point comprising a value of the target feature;

receive the target data point in response to the request; and further train the generative network based on the received target data point, thereby updating the posterior distribution $p(\theta|X_o)$.

10. The computer of claim 9, wherein the weights θ of the generative network correspond to a quantity of connections between nodes of the generative network.

11. The computer of claim 9, wherein the requesting of the observation of the target data point includes requesting an automated process to collect the target data point.

12. The computer of claim 9, wherein the generative network further includes an inference network having the feature vector as an input vector and a latent vector as an output vector, the inference network and the generative network forming an encoder and decoder respectively of a variational auto encoder, wherein the training further comprises learning weights of the inference network which map the feature vector to the latent vector.

13. The computer of claim 12, wherein the weights of the inference network applied by a node in the inference network are modelled as a probabilistic distribution.

14. The computer of claim 12, wherein a quantity of connections between nodes in the inference network is modelled as a probabilistic distribution.

15. The computer of claim 9, further comprising:

repeating multiple iterations of the further training, each iteration including the received target data point from a previous iteration amongst the observed data point; and using the generative network to impute the feature value of a further data point after each iteration of the further training.

16. A non-transitory memory device storing device-executable code, wherein the code when executed by a processing apparatus directs the processing apparatus to perform operations comprising:

obtaining an observed data point comprising a feature value, the feature value being a value of a corresponding feature in a feature vector;

training a generative network based on the observed data point, wherein weights θ of the generative network are modeled by a probabilistic distribution;

from amongst a plurality of potential unobserved features to observe, searching for a target feature that maximizes, based on the observed data point, a measure of expected reduction in uncertainty in a posterior distribution of the weights of the generative network, wherein:

the posterior distribution is conditioned on the observed data point; and the measure of expected reduction in uncertainty comprises a combination of:

a measure of conditional mutual information in the weights θ of the generative network; and a predicted classification, the predicted classification being based on the observed data point and the potential unobserved features;

requesting observation of a target data point comprising a value of the target feature;

receiving the target data point in response to the requesting; and further training the generative network based on the received target data point, thereby updating the posterior distribution.

17. The non-transitory memory device of claim 16, wherein the weights θ of the generative network correspond to a quantity of connections between nodes of the generative network.

18. The non-transitory memory device of claim 16, wherein the requesting of the observation of the target data point includes requesting an automated process to collect the target data point.

19. The non-transitory memory device of claim 16, wherein the generative network further includes an inference network having the feature vector as an input vector and a latent vector as an output vector, the inference network and the generative network forming an encoder and decoder respectively of a variational auto encoder, wherein the training further comprises learning weights of the inference network which map the feature vector to the latent vector.

20. The non-transitory memory device of claim 19, wherein the weights of the inference network applied by a node in the inference network are modelled as a probabilistic distribution.

\* \* \* \* \*